(12) United States Patent
Gyotoku et al.

(10) Patent No.: US 8,773,547 B2
(45) Date of Patent: Jul. 8, 2014

(54) IMAGING APPARATUS FOR FACILITATING A FOCUS ADJUSTMENT CHECK AT THE TIME OF MULTIPLE EXPOSURE SHOOTING

(75) Inventors: Takashi Gyotoku, Kawasaki (JP); Tohru Ishibashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 13/454,832

(22) Filed: Apr. 24, 2012

(65) Prior Publication Data

US 2012/0274812 A1 Nov. 1, 2012

(30) Foreign Application Priority Data

Apr. 28, 2011 (JP) ................................. 2011-101312

(51) Int. Cl.
*H04N 5/335* (2011.01)
*H04N 5/262* (2006.01)

(52) U.S. Cl.
USPC .......................... 348/222.1; 348/345; 348/239

(58) Field of Classification Search
USPC ................................ 348/222.1–239, 345–357
See application file for complete search history.

(56) References Cited

U.S. PATENT DOCUMENTS

| | | | |
|---|---|---|---|
| 6,987,535 B1 * | 1/2006 | Matsugu et al. | 348/239 |
| 7,057,650 B1 * | 6/2006 | Sakamoto | 348/239 |
| 7,787,028 B2 * | 8/2010 | Kojo | 348/239 |
| 2002/0122605 A1 * | 9/2002 | Chang | 382/284 |
| 2008/0278618 A1 * | 11/2008 | Matsumoto et al. | 348/345 |
| 2009/0021594 A1 * | 1/2009 | Tsuda et al. | 348/222.1 |
| 2009/0175609 A1 * | 7/2009 | Tan | 396/77 |
| 2010/0026834 A1 * | 2/2010 | Hong | 348/222.1 |
| 2010/0225785 A1 * | 9/2010 | Shimizu et al. | 348/231.99 |
| 2010/0321534 A1 * | 12/2010 | Kim | 348/239 |
| 2012/0005595 A1 * | 1/2012 | Gavade et al. | 715/751 |

FOREIGN PATENT DOCUMENTS

| | | |
|---|---|---|
| JP | 2003-69888 A | 3/2003 |
| JP | 2003-125266 A | 4/2003 |
| JP | 2005-102263 A | 4/2005 |

* cited by examiner

*Primary Examiner* — Twyler Haskins
*Assistant Examiner* — Dwight C Tejano
(74) *Attorney, Agent, or Firm* — Canon U.S.A., Inc. IP Division

(57) ABSTRACT

The present invention provides an imaging apparatus capable of facilitating a user's check of a focus adjustment state at the time of multiple exposure shooting, and also allowing a user to easily check in what kind of composition an image to be shot now will be combined with an already captured image immediately before shooting. The imaging apparatus includes a display control unit configured to perform control to display a through-the-lens image captured by an imaging unit on a display unit while sequentially updating the through-the-lens image during a focus adjustment, and display a multiple image combination result image generated by combining the through-the-lens image captured by the imaging unit and at least one already captured image on the display unit while sequentially updating the multiple image combination result image after completion of the focus adjustment.

10 Claims, 15 Drawing Sheets

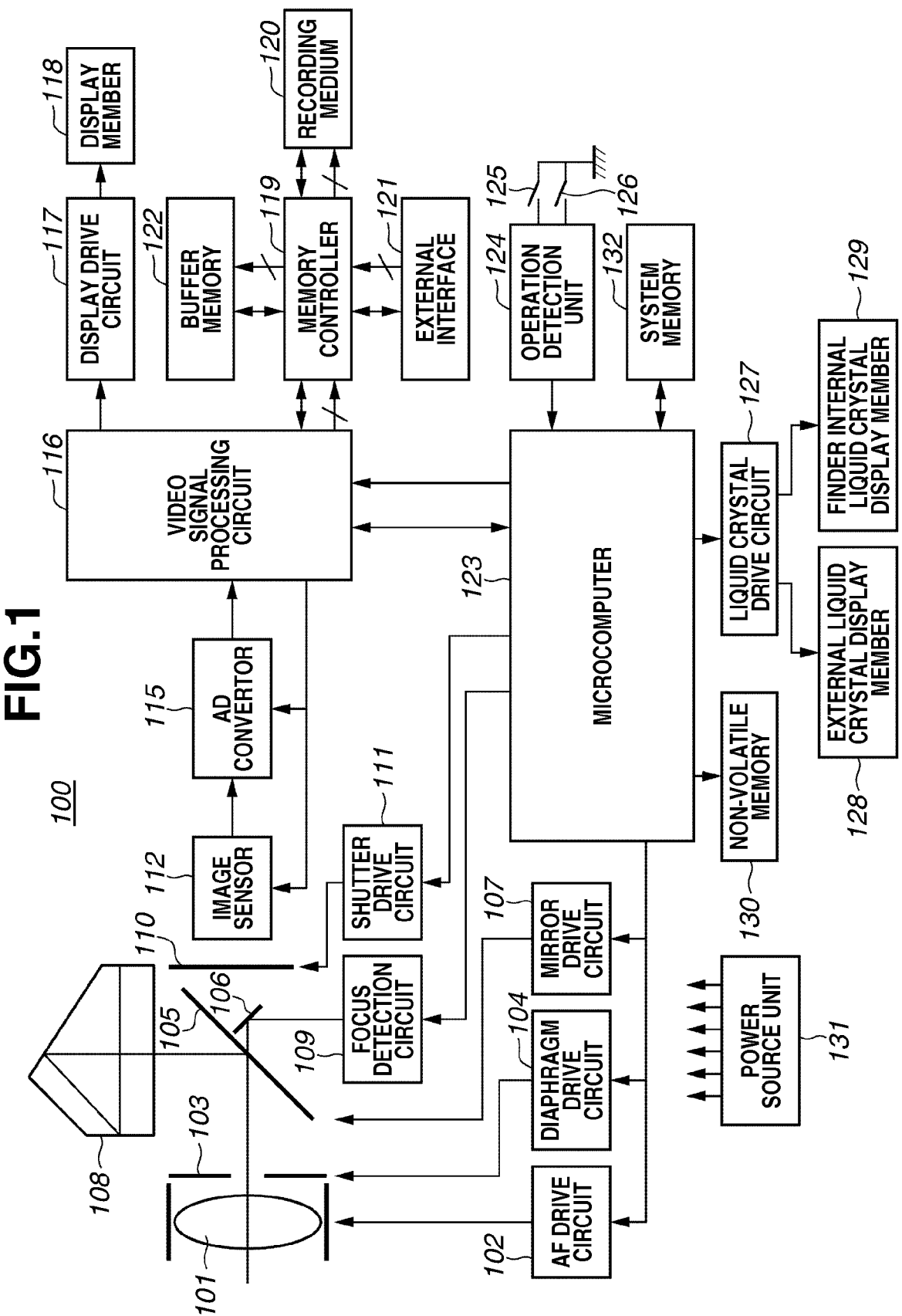

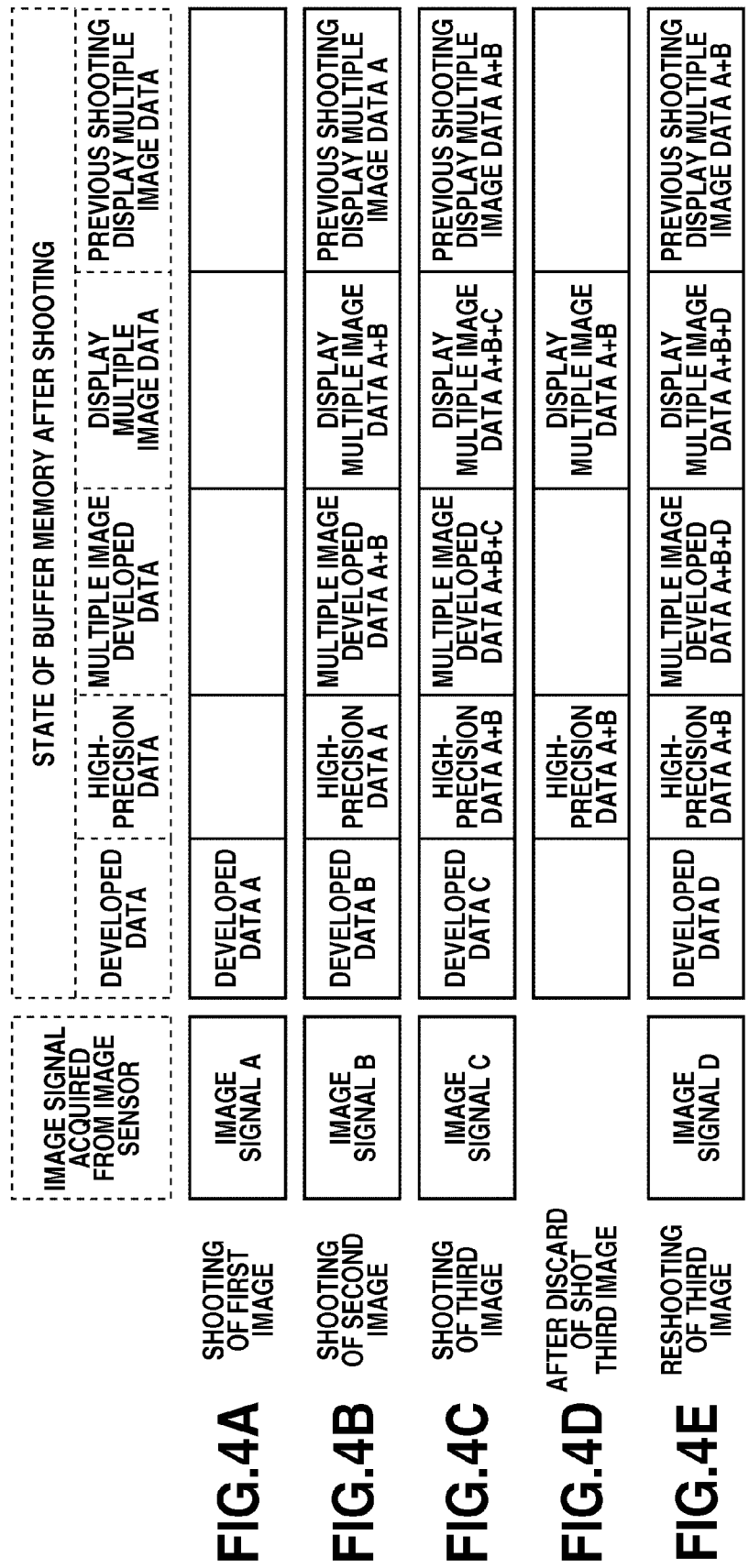

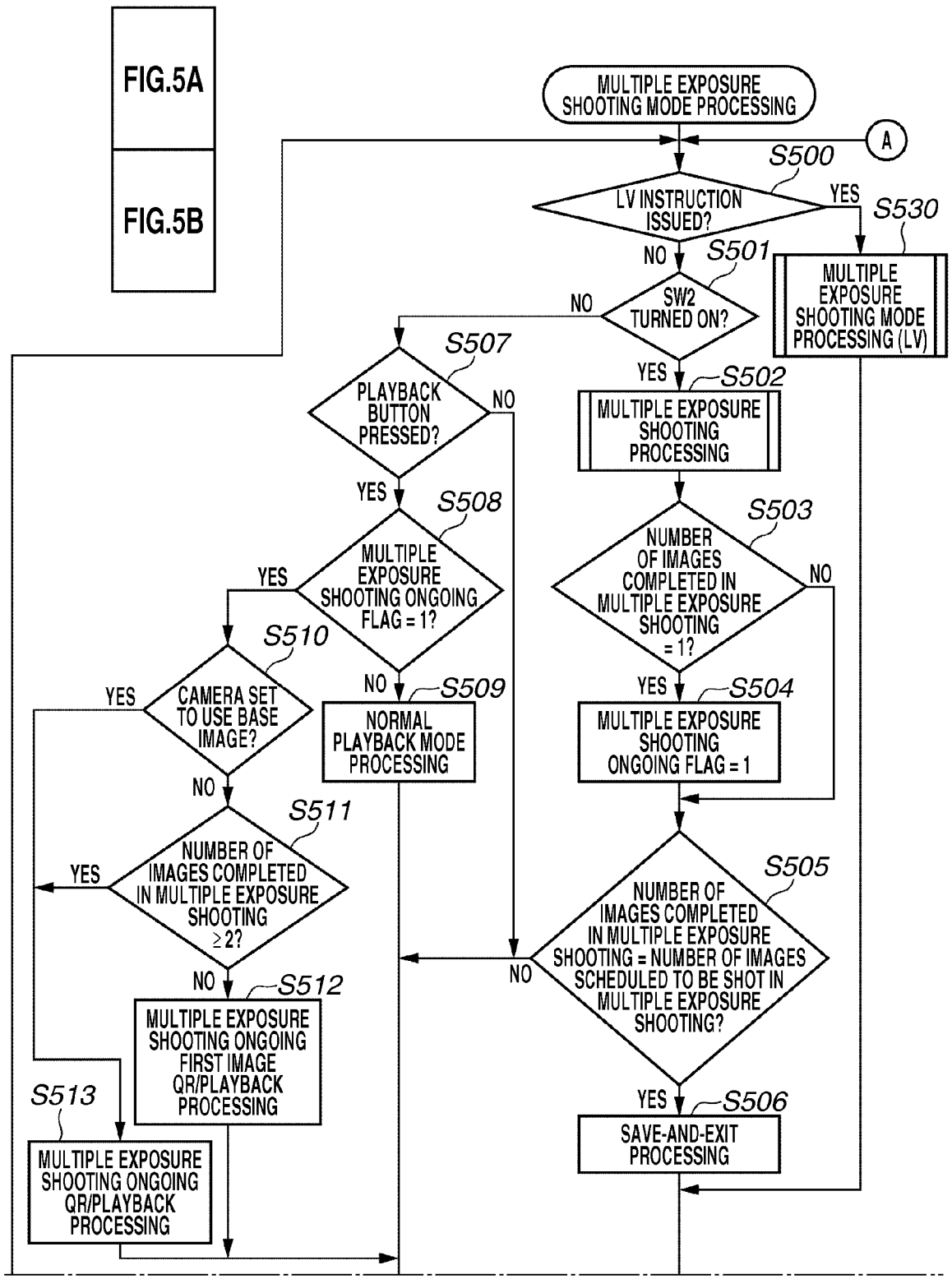

FIG.10A
COMBINATION RATIO FOR MULTIPLE IMAGE LV
(IN AUTOMATIC EXPOSURE ADJUSTMENT MODE)

|  |  | COMBINATION RATIO | | | | |
| --- | --- | --- | --- | --- | --- | --- |
|  |  | THROUGH-THE-LENS IMAGE | FIRST IMAGE | SECOND IMAGE | THIRD IMAGE | FOURTH IMAGE |
| NUMBER OF SHOT IMAGE(S) | NO SHOT IMAGE | 100% | – | – | – | – |
| | FIRST IMAGE | 60% | 40% | – | – | – |
| | SECOND IMAGE | 60% | 20% | 20% | – | – |
| | THIRD IMAGE | 60% | 13.3% | 13.3% | 13.3% | – |
| | FOURTH IMAGE | 60% | 10% | 10% | 10% | 10% |

FIG.10B
COMBINATION RATIO FOR SIMULATION LV
(IN AUTOMATIC EXPOSURE ADJUSTMENT MODE)

|  |  | COMBINATION RATIO | | | | |
| --- | --- | --- | --- | --- | --- | --- |
|  |  | THROUGH-THE-LENS IMAGE | FIRST IMAGE | SECOND IMAGE | THIRD IMAGE | FOURTH IMAGE |
| NUMBER OF SHOT IMAGE(S) | NO SHOT IMAGE | 100% | – | – | – | – |
| | FIRST IMAGE | 50% | 50% | – | – | – |
| | SECOND IMAGE | 33.3% | 33.3% | 33.3% | – | – |
| | THIRD IMAGE | 25% | 25% | 25% | 25% | – |
| | FOURTH IMAGE | 20% | 20% | 20% | 20% | 20% |

_US 8,773,547 B2_

IMAGING APPARATUS FOR FACILITATING A FOCUS ADJUSTMENT CHECK AT THE TIME OF MULTIPLE EXPOSURE SHOOTING

BACKGROUND OF THE INVENTION

1. Field of the Invention

The present invention relates to an imaging apparatus, and, in particular, to an imaging apparatus capable of combining a plurality of captured images.

2. Description of the Related Art

Conventionally, there has been a technique of realizing multiple exposure shooting by adding a plurality of digital image signals. Japanese Patent Application Laid-Open No. 2003-69888 discusses a technique related to shooting processing using a multiple exposure function of generating a single image through a plurality of exposures. According to the technique discussed in Japanese Patent Application Laid-Open No. 2003-69888, image data of each frame stored in an image memory is combined with each other by averaging processing, and the result thereof is stored in the image memory. Japanese Patent Application Laid-Open No. 2003-125266 discusses a technique for displaying a combined image of an already captured image and a through-the-lens image, and allowing a user to perform multiple exposure shooting after confirming the position where an object is combined. Japanese Patent Application Laid-Open No. 2005-102263 discusses a technique for combining an image captured by preliminary shooting and a through-the-lens image to display the combined image, and stopping the display of the combined image upon a start of automatic focus (AF) processing in response to half-pressing of a shutter button to start a display showing only the through-the-lens image.

During the multiple exposure shooting as discussed in the above-described patent documents, Japanese Patent Applications Laid-Open No. 2003-69888 and No. 2003-125266, if a displayed image can be switched from a combined image to only a through-the-lens image in response to half-pressing of the shutter button as discussed in Japanese Patent Application Laid-Open No. 2005-102263, it is helpful for a user to check a focus adjustment state at the time of the AF processing. However, in this case, the user cannot check the composition, i.e., in what kind of composition an image to be shot now will be combined with the already captured image, after the AF processing is completed and immediately before shooting by fully pressing the shutter button. Therefore, if the user wants to check the composition of the combined image, the user needs to release the shutter button first, and then repeat the AF processing to shoot an image after adjusting the composition, which requires a bothersome operation to the user.

SUMMARY OF THE INVENTION

The present invention is directed to an imaging apparatus capable of facilitating a user's check of a focus adjustment state at the time of multiple exposure shooting, and also allowing a user to easily check what kind of composition an image to be shot now will be combined with an already captured image immediately before shooting.

According to an aspect of the present invention, an imaging apparatus includes an imaging unit, a generation unit configured to generate a multiple image combination result image by combining a through-the-lens image captured by the imaging unit and at least one already captured image, a focus adjustment unit configured to perform a focus adjustment by driving a focus lens, and a display control unit configured to perform control to display the through-the-lens image captured by the imaging unit on a display unit while sequentially updating the through-the-lens image when the focus adjustment unit is performing the focus adjustment, and display the multiple image combination result image generated by the generation unit on the display unit while sequentially updating the multiple image combination result image after the focus adjustment unit completes the focus adjustment.

According to the aspect of the present invention, since the display can be switched to a more suitable display according to a user's operation state, it is possible to facilitate a user's check of a focus adjustment state at the time of multiple exposure shooting, and also allowing a user to easily check in what kind of composition an image to be shot now will be combined with the already captured image immediately before shooting.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a configuration of a digital camera.

FIGS. 4A to 4E illustrate image data to be stored in a buffer memory 122 during multiple exposure shooting.

FIG. 10A illustrates examples of combination ratios for a multiple image live view in an automatic exposure adjustment mode.

FIG. 10B illustrates examples of combination ratios for a simulation live view in the automatic exposure adjustment mode.

DESCRIPTION OF THE EMBODIMENTS

Figure 2A:
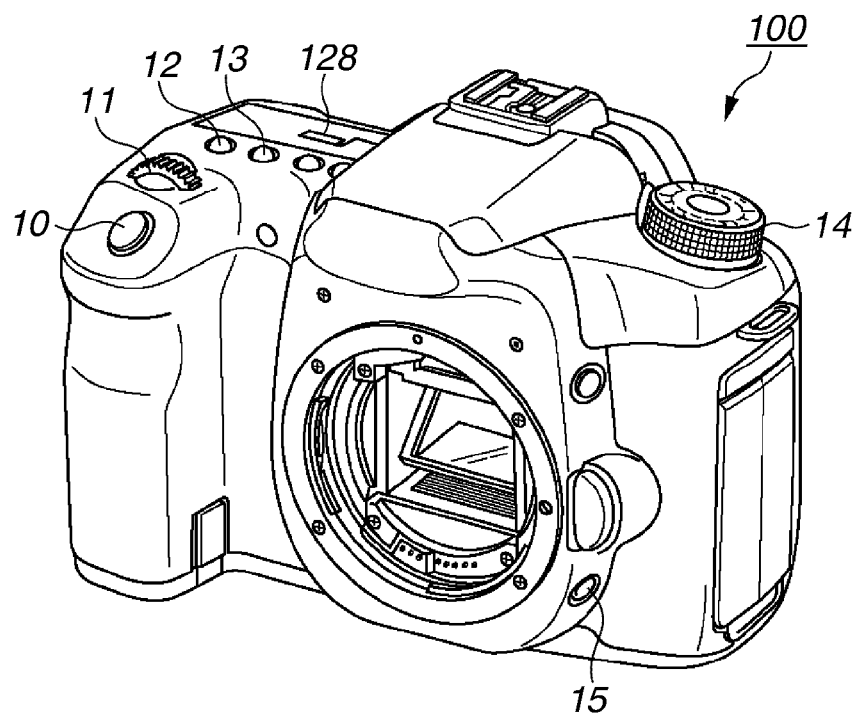
FIGS. 2A and 2B illustrate an outer appearance of the digital camera.

Various exemplary embodiments, features, and aspects of the invention will be described in detail below with reference to the drawings.

FIG. 1 is a block diagram illustrating a configuration of a digital camera 100 according to an exemplary embodiment of an imaging apparatus to which the present invention can be applied. In FIG. 1, a photographic lens 101 is a detachably attached interchangeable lens constituted by, for example, a zoom lens and a focus lens.

An automatic focus (AF) drive circuit 102 includes, for example, a direct-current (DC) motor or a stepping motor, and functions to focus the digital camera 100 by changing a position of the focus lens included in the photographic lens 101 under the control of a microcomputer 123.

A diaphragm drive circuit 104 drives a diaphragm 103 which adjusts a light amount transmitted to an image sensor 112. The microcomputer 123 calculates an amount to drive the diaphragm 103, and the diaphragm drive circuit 104 changes an optical diaphragm value accordingly.

A main mirror 105 is a mirror for selectively guiding a light flux incident from the photographic lens 101 to a finder side or the image sensor 112 side. Normally, the main mirror 105 is disposed to reflect the light flux to guide it to the finder portion. On the other hand, during shooting or a live view display, the main mirror 105 is flipped up and retracts from the light flux to guide the light flux to the image sensor 112 (mirror-up processing). Further, the main mirror 105 is configured as a half mirror having a central portion allowing apart of light to be transmitted therethrough. Therefore, the main mirror 105 allows a part of the light flux to pass therethrough and enter a sensor for focus detection.

A sub mirror 106 is a mirror for reflecting the light flux transmitted through the main mirror 105 to guide it to the sensor for focus detection (disposed in a focus detection circuit 109).

A mirror drive circuit 107 drives the main mirror 105 under the control of the microcomputer 123.

A pentagonal prism 108 constitutes the finder. The finder is constituted by, for example, a focus plate and an eyepiece lens (not illustrated), in addition to the pentagonal prism 108.

The focus detection circuit 109 is a block for focus detection. After being transmitted through the central portion of the main mirror 105 and reflected by the sub mirror 106, the light flux is incident on the sensor for photoelectrically converting the light flux, which is disposed in the focus detection circuit 109. A defocus amount to be used in a focus calculation is determined by calculating an output from the sensor. The microcomputer 123 evaluates the calculation result, and instructs and causes the AF drive circuit 102 to drive the focus lens.

A shutter drive circuit 111 drives a focal plane shutter 110. How long the shutter is opened is controlled by the microcomputer 123.

The image sensor 112 is embodied by, for example, a charge coupled device (CCD) or a complementary metal-oxide semiconductor (CMOS) sensor, and functions to convert an object image formed by the photographic lens 101 into an electric signal.

An analog-to-digital (AD) converter 115 converts an analog output signal output from the image sensor 112 into a digital signal.

A video signal processing circuit 116 is realized by a logic device such as a gate array, and is in charge of various types of video signal processing.

A display drive circuit 117 is a drive circuit which causes a display member 118 to display an image. The display member 118 is a display unit such as a thin film transistor (TFT) liquid crystal display or an organic electroluminescent (EL) display, and corresponds to a rear side monitor of the digital camera 100 in the present exemplary embodiment.

A memory controller 119 stores unprocessed digital image data input from the video signal processing circuit 116 into the buffer memory 122, and stores processed digital image data into a recording medium 120. Further, the memory controller 119 reads out the image data from the buffer memory 122 and the recording medium 120 to output it to the video signal processing circuit 116. Further, the memory controller 119 can output an image stored in the recording medium 120 via an external interface 121, which can connect to a computer and the like.

The recording medium 120 is a detachable recording medium such as a memory card. Alternatively, the recording medium 120 may be a recording medium integrally mounted in the digital camera 100, or may be constituted by a plurality of recording media.

The external interface 121 is an interface for connecting the digital camera 100 to an external apparatus such as a computer via wired or wireless communication.

The buffer memory 122 is a memory for temporarily storing image data. Various types of images used during multiple exposure shooting are also stored in the buffer memory 122.

The video signal processing circuit 116 applies filtering processing, color conversion processing, and gamma processing on the digitized image signal to generate developed data. In addition, the video signal processing circuit 116 applies compression processing such as Joint Photographic Experts Group (JPEG) compression processing on the developed data and then outputs the compressed data to the memory controller 119.

The video signal processing circuit 116 can add two or more developed data pieces stored in the buffer memory 122, and generate high-precision data from the developed data by increasing a bit rate for gradation, or simultaneously perform both the addition of developed data and the generation of high-precision data to write the result data back into the buffer memory 122. Further, the video signal processing circuit 116 can output a video signal input from the image sensor 112 and an image signal conversely input from the memory controller 119 to the display member 118 via the display drive circuit 117. These functions can be switched according to an instruction from the microcomputer 123.

The video signal processing circuit 116 can output, for example, exposure information and white balance information of a signal of the image sensor 112 to the microcomputer 123 if necessary. The microcomputer 123 issues instructions for white balance control and gain adjustment based on these pieces of information. During continuous shooting processing, shot data is temporarily stored into the buffer memory 122 before any processing is applied thereto, the unprocessed image data is read out via the memory controller 119, and the video single processing circuit 116 applies image processing and compression processing, thereby realizing continuous shooting. The number of continuously shot images varies according to the capacity of the buffer memory 122.

The microcomputer 123 is a main control unit comprehensively controls the entire digital camera 100. The microcomputer 123 uses a system memory 132 as a work memory, and executes various types of programs recorded in a non-volatile memory 103.

An operation detection unit 124 detects that an operation member is operated, and notifies the microcomputer 123 of the state when the operation member is operated. The microcomputer 123 controls the respective units according to the change of the operation member. The operation detection unit 124 can also detect an open and closed state of a cover 28 (hereinbelow referred to as "card cover 28") of a slot adapted to contain the recording medium 120 and a battery cover 29.

A switch 1 (125) (hereinbelow referred to as "SW1") is a switch configured to be turned on by half-pressing of a release button 10, which is one of operation members. When the switch SW1 is turned on, the microcomputer 123 starts shooting preparation processing including automatic focus (AF) processing and light metering processing.

A switch 2 (126) (hereinbelow referred to as "SW2") is a switch configured to be turned on by full-pressing of the release button 10, which is one of operation members. When the switch SW2 is turned on, the microcomputer 123 starts actual shooting processing to capture an image and record the captured image into the recording medium 120 as an image file. Further, when the SW1 and SW2 remain turned on, the continuous shooting is executed.

A liquid crystal drive circuit 127 drives an external liquid crystal display member 128 and a finder internal liquid crystal display member 129, which display, for example, a processing status and a message using characters and an image, according to a display content instruction from the microcomputer 123. A backlight unit such as a light emitting diode (LED) (not illustrated) is disposed at the finder internal liquid crystal display member 129, and the LED is also driven by the liquid crystal drive circuit 127.

The microcomputer 123 can calculate the number of remaining shots allowed to be shot after checking the remaining capacity of the recording medium 120 via the memory controller 119 based on estimated value data of an image size according to International Standardization Organization (ISO) sensitivity, an image size, and an image quality which are set before shooting. The number of remaining sheets allowed to be shot can be also displayed on the display member 18, the external liquid crystal display member 128, and the finder internal liquid crystal display member 129 if necessary.

The non-volatile memory 130 is embodied by, for example, an electrically erasable programmable read-only memory (EEPROM) or a flash memory, and can keep data stored even when a power source 131 of the digital camera 100 is not turned on. The power source 131 supplies required power to the respective blocks and drive systems.

Figure 2B:
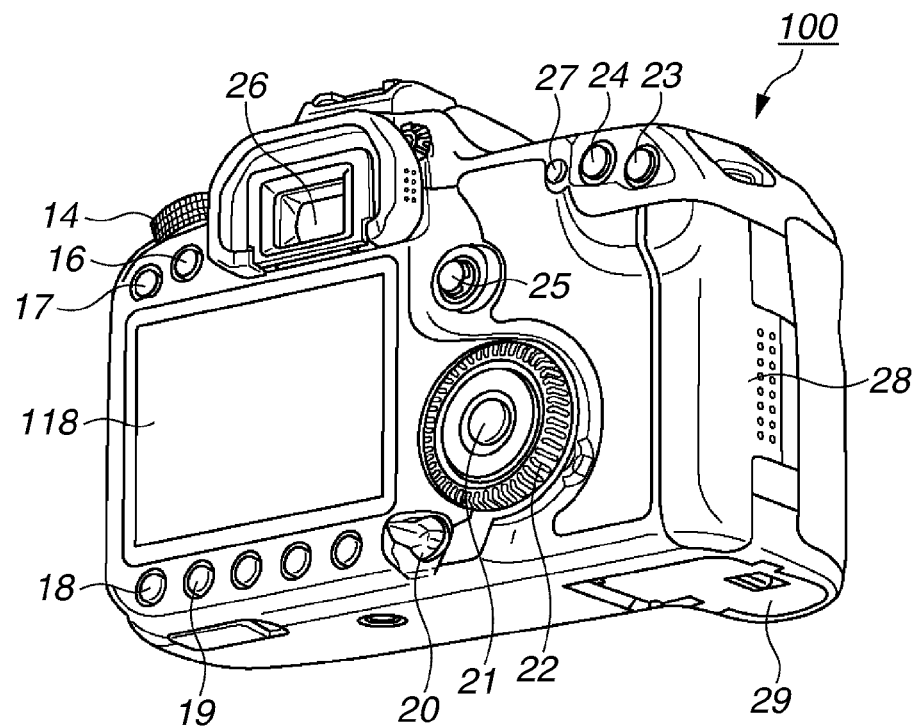

FIGS. 2A and 2B illustrate an outer appearance of the digital camera 100. FIG. 2A is a perspective view of the digital camera 100 as viewed from the front side thereof. FIG. 2B is a perspective view of the digital camera 100 as viewed from the back side thereof. In the perspective view from the front side, the digital camera 100 is illustrated with the interchangeable photographic lens 101 removed therefrom.

As illustrated in FIG. 2A, the digital camera 100 includes the release button 10, a main electronic dial 11, an ISO setting button 12, an exposure correction button 13, a shooting mode dial 14, and a diaphragm closing button 15, as operation members. The diaphragm closing button 15 is a button for closing the diaphragm 104 to achieve a set diaphragm state (F value). By pressing the diaphragm closing button 15 during a live view display in a shooting mode, a photographer can check the brightness of an image to be captured in the set diaphragm state.

The live view display means a display enabling the display member 118 to function as an electronic view finder by causing the display member 118 to continuously display an image (a through-the-lens image) captured by the image sensor 112 substantially in real time in such a state that the main mirror 105 is retracted. During the live view display, an image formed on the image sensor 112 is converted into a digital signal by the AD converter 115, is developed by the video signal processing circuit 116, and then is regenerated as the through-the-lens image. The generated through-the-lens image, or a multiple image combination result image generated by combining the through-the-lens image and an already captured image is displayed on the display member 118. The displayed image is sequentially updated, and is viewed as a moving image. For example, this processing is repeated thirty times per second, thereby realizing the live view display of 30 frames per second (fps).

The main electronic dial 11 is a rotational operation member, and is used in, for example, an operation such as increasing or reducing various types of setting values of shooting conditions or the like, changing a selected item when a photographer selects various items, and switching images set by set in a playback mode.

As illustrated in FIG. 2B, the digital camera 100 includes an information display button 16, a menu button 17, a playback button 18, a deletion button 19, a main switch (SW) 20, and a setting button 21 as operation members. Further, the digital camera 100 includes a sub-electronic button 22, a size enlargement button 23, a size reduction button 24, and a multifunction controller 25.

The main SW 20 is an operation member for switching an ON state and an OFF state of the power source of the digital camera 100. The sub-electronic dial 22 is a rotational operation member, and is used for, for example, an operation of changing a selected item when a photographer selects various items, and an image advancing operation of switching a displayed image in the playback mode. A finder eyepiece portion 26 is an eyepiece portion used when a user peers into the finder to view an optical image. A live view button 27 is a button for receiving an instruction to start the live view display, and a photographer can turn on and off the live view display by pressing the live view button 27. The card cover 28 is a cover of a container configured to contain the recording medium 120. The battery cover 29 is a cover of a container configured to contain a battery which functions as the power source unit 131.

The digital camera 100 can perform multiple exposure shooting by adding a plurality of digital image signals. Multiple exposure shooting is started when a user selects "ENABLED" at the item of "MULTIPLE EXPOSURE" shooting to set the multiple exposure shooting mode, on a menu screen, which will be described below with reference to FIG. 3. The digital camera 100 adds a plurality of images shot after the multiple exposure shooting mode is set (hereinbelow referred to as "multiple images" or "multiple image combination") to generate a multiple image combination result image, and records the generated image onto the recording medium 120 as an image file. The addition processing method for generating the multiple image combination result image recorded in the recording medium 120 may be embodied by any one of two methods "additive mode" and "automatic exposure adjustment mode".

In the additive mode, as indicated by an equation (1), the addition processing is performed at a combination ratio, which is calculated by just adding up luminance of each of a plurality of images to be combined. As a result of the addition as indicated by the equation (1), a recordable maximum value of luminance is set as an upper limit (in a saturated state), even in the case that the luminance may exceed the recordable maximum value of luminance. On the other hand, in the automatic exposure adjustment mode, as indicated by an equation (2), the addition processing is performed at such a combination ratio that a multiple image combination result image has a luminance value equal to the average of the luminance values of the respective images to be added.

$$Y_n = y_1 + y_2 + \ldots + y_{n-1} + y_n \quad (1)$$

$$Y_n = (y_1 + y_2 + \ldots + y_{n-1} + y_n)/n \quad (2)$$

In these equations:

Yn represents the luminance of a multiple image combination image to be generated by combining "n" pieces of images;
y1 represents the luminance of the first image;
y2 represents the luminance of the second image;
yn−1 represents the luminance of the (n−1)-th image;
yn represents the luminance of the n-th image; and
n represents the number of images to be added.

The equations (1) and (2) may be respectively converted, and based on equations (3) and (4), which express the same processing as the equations (1) and (2), multiple image combination may be performed with use of an already combined image of multiple images including the image immediately before the n-th image. More specifically, in a case where the automatic exposure adjustment function is set to "DISABLED" (the additive mode), the addition processing is performed as indicated by the equation (3), which will be described below, to obtain the combination ratio as indicated by the above-described equation (1) to perform multiple image combination. On the other hand, in a case where the automatic exposure adjustment function is set to "ENABLED" (the automatic exposure adjustment mode), the addition processing is performed as indicated by the equation (4), which will be described below, to obtain the combination ratio as indicated by the above-described equation (2) to perform multiple image combination.

$$Yn = Yn-1 + yn \quad (3)$$

$$Yn = \{(Yn-1) \times (n \times 1)/n\} + \{yn \times 1/n\} \quad (4)$$

In these equations:
Yn represents the luminance of a multiple image combination image to be generated by combining "n" pieces of images;
Yn−1 represents the luminance of a multiple image combination result image generated by combining (n−1) pieces of images;
yn represents the luminance of the n-th image; and
n represents the number of images to be added.

When the live view display is started in the multiple exposure shooting mode, the digital camera 100 displays an image generated by combining a base image (in a case where the digital camera 100 is set to use a base image), an already captured image that has been already captured after the multiple exposure shooting mode had been started, and a through-the-lens image. The base image means an image selected from images recorded in the recording medium 120 before the multiple exposure shooting mode is set as an image to be combined with an image that will be shot in multiple exposure shooting. As a result, a user can shoot an image while confirming what kind of composition the next shooting image is combined with other images.

However, in the live view display, if the addition processing is performed using the same combination ratio as the one used when a multiple image combination result image is generated to be stored in the recording medium 120 as indicated by the above-described equations (1) and (2), a display of a through-the-lens image may have low visibility to a user (may result in a display of an unclear image to a user). Such display makes it difficult for a user to adjust the composition to determine in what kind of composition the user should shoot a next image while viewing the through-the-lens image.

For example, in the additive mode, the addition of luminance at a bright area may result in saturation of the luminance (the luminance may reach the maximum luminance), which prevents an easy check of the composition or the focus state. Whereas in the automatic exposure adjustment mode, luminance values of shot images are averaged. Thus, for example, if the number of images that have been already shot in the multiple exposure shooting mode increased, the percentage of the luminance of one image will be reduced, and therefore a reduction in the percentage of the luminance of the through-the-lens image will make it difficult to check the composition or the focus state of the image.

Therefore, normally, the present exemplary embodiment sets a higher combination ratio for a through-the-lens image than the combination ratio of an already captured image to be combined, when the through-the-lens image and the already captured image are combined to be displayed in the live view display in the multiple exposure shooting mode. Increasing the combination ratio of the through-the-lens image in this way can provide a clear display of the through-the-lens image relative to the already captured image, and improve the visibility of the through-the-lens image. Further, setting a fixed combination ratio for the through-the-lens image regardless of the number of already captured images to be combined can further improve the visibility of the through-the-lens image.

More specifically, if the multiple image combination is performed for the live view display, a combination ratio is set according to the following equation (5).

$$Y1 = \{Yn \times (1-M)\} + \{yt \times M\} \quad (5)$$

In this equation:
Y1 represents the luminance of a multiple image combination result image to be displayed in the live view display;
yt represents the luminance of a through-the-lens image;
Yn represents the luminance of an image generated by combining "n" pieces of images that have already been captured until that time, i.e., the luminance of an already captured image to be combined with the through-the-lens image; and
M represents the combination ratio of the through-the-lens image in the multiple image combination result image to be displayed in the live view display.

In the above-described equation (5), M is 0.5 or more and less than 1. More specifically, the combination ratio of the luminance of a through-the-lens image is set to be higher than the total of the combination ratios of the luminance of already captured images with which the through-the-lens image is combined. Alternatively, the combination ratio of the luminance of a through-the-lens image may be set to be higher than each of the combination ratios of the individual already captured images to be combined.

The digital camera 100 may be set in such a manner that, in the live view display, the multiple image combination may be omitted and only a through-the-lens image is displayed. In this case, the digital camera 100 may employ an algorithm for displaying only the through-the-lens image by substituting 1 for M (M=1) and substituting 0 for the combination ratio (1−M) of the luminance Yn of the already captured image in the equation (5). Displaying only the through-the-lens image can facilitate confirmation of the current focus state of the through-the-lens image.

Generating a multiple image combination result image to be displayed in the live view display according to the equation (5) can improve the visibility of the through-the-lens image. However, the multiple image combination result image generated according to the equation (5) has a different combination ratio from the multiple image combination result image to be generated after the actual shooting according to the equation (1) or (3), or the equation (2) or (4) and recorded in the recording medium 120. Therefore, from the multiple image combination result image generated according to the equation (5), it cannot be confirmed what kind of image is actually generated as a multiple image combination result image to be recorded in the recording medium 120 (especially, what kind of luminance balance the image will have, and how bright the image will be). Further, the live view display may become useless as reference data for setting shooting conditions such as an exposure.

Therefore, according to the present exemplary embodiment, upon pressing of the diaphragm closing button 15 during the live view display in the multiple exposure shooting mode, the digital camera 100 provides a display allowing a user to preliminarily simulate and confirm what kind of image is generated as a multiple image combination result image by actual shooting. This display is referred to as "simulation live view display". A multiple image combination result image to be displayed in the simulation live view display is combined according to an equation (6) in a case where the automatic exposure adjustment function is set to "DISABLED (i.e., in the additive mode)", and according to an equation (7) in a case where the automatic exposure adjustment function is set to "DISABLED" (i.e., in the automatic exposure adjustment mode) according to the setting of the multiple exposure adjustment function.

$$Ys = Yn + yt \quad (6)$$

$$Ys = \{Yn \times n/(n+1)\} + \{yt \times 1/(n+1)\} \quad (7)$$

In these equations:

Ys represents the luminance of a multiple image combination result image to be displayed in the simulation live view display;

yt represents the luminance of a through-the-lens image;

Yn represents the luminance of an image generated by combining "n" pieces of images that have been already captured until that time, i.e., the luminance of an already captured image to be combined with the through-the-lens image; and n represents the number of images that have been already acquired until that time. In particular, in a case where the digital camera 100 is not set to use a base image, "n" is the number of images shot up to that time in one set of multiple exposure shooting. Whereas in a case where the digital camera 100 is set to use a base image, "n" is the number of images shot up to that time in one set of multiple exposure shooting with the value 1 added thereto.

In the equations (6) and (7), the combination ratio of the luminance of the already captured image Yn is the same as the combination ratio in the multiple image combination result image Yn+1 to be recorded in the recording medium 120 in multiple image combination performed at the time of actual shooting of one more image.

Multiple image combination based on the above-described equations (1) to (7) may be performed for each color.

Operations performed in multiple exposure shooting for multiple image combination at the above-described combination ratio will be described in detail below.

First, how to set preliminary setting items regarding multiple exposure shooting will be described.

Figure 3A:
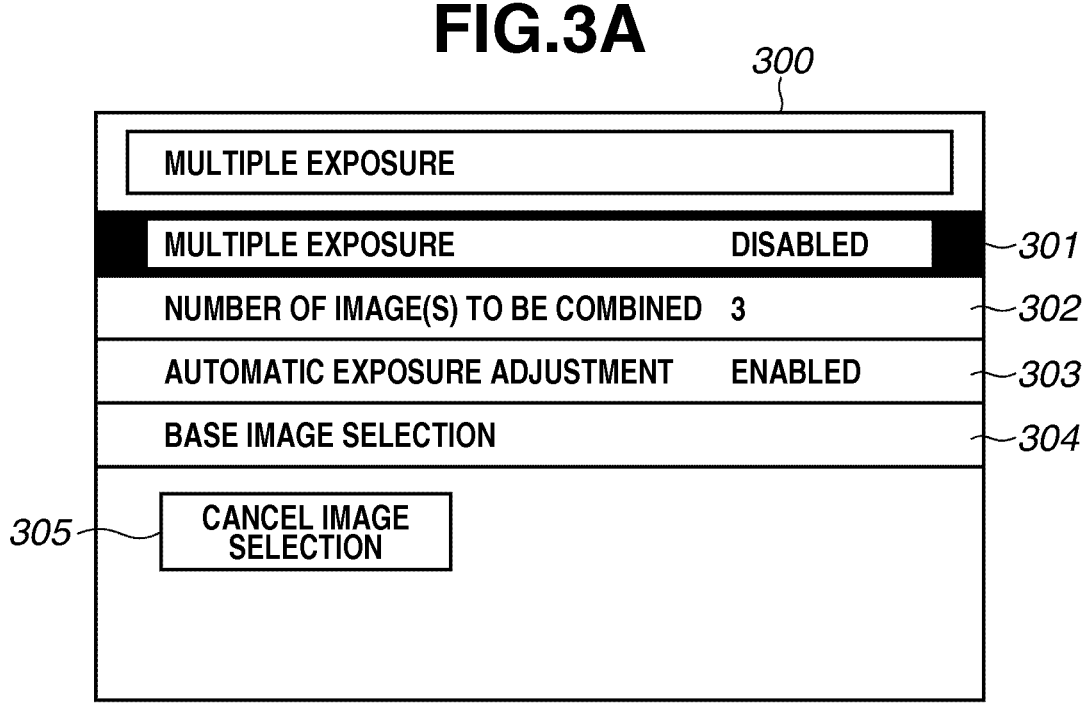
FIGS. 3A and 3B illustrate a display example of a menu screen for preliminary settings regarding multiple exposure shooting.
Figure 3B:
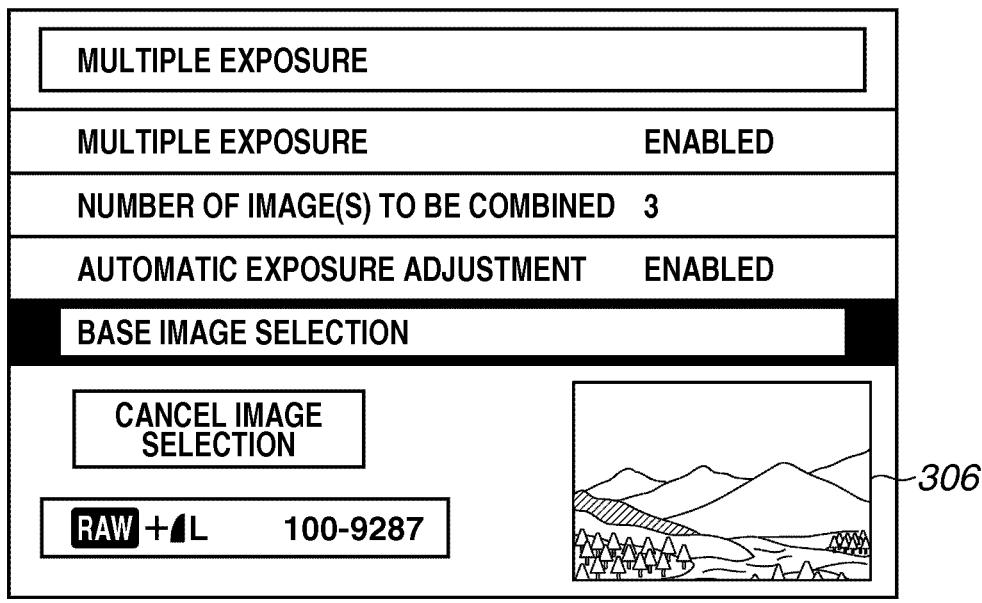

FIGS. 3A and 3B each illustrate a display example of a menu screen where a user selects the settings of the digital camera 100 regarding multiple exposure shooting. When a user presses the menu button 17 to display a main menu, selects a menu regarding multiple exposure shooting from the main menu, and then finalizes the selection, a menu screen 300 regarding multiple exposure shooting illustrated in FIG. 3A is displayed on the display member 118.

The menu screen 300 includes menu items 301 to 304. A user can select arbitrary menu item from the menu items 301 to 304 by operating the sub-electronic dial 22. When the user selects one of the menu items and presses the setting button 21, a list of setting candidates regarding the selected menu item is displayed. Then, by selecting a desired setting candidate from the displayed setting candidate list by, for example, operating the sub-electronic dial 22 and pressing the setting button 21 again, the user can finalize and set the selected setting candidate as a setting value.

The menu item 301 is a menu item for selecting whether multiple exposure shooting is performed, and can be set by selecting any of two setting candidates "ENABLED" and "DISABLED". Hereinbelow, the setting of this item is referred to as "multiple exposure shooting necessary/unnecessary setting". The multiple exposure shooting necessary/unnecessary setting is recorded in the system memory 132 or the non-volatile memory 130. When the multiple exposure shooting necessary/unnecessary setting is changed from "DISABLED" to "ENABLED" according to a user's operation, multiple exposure shooting is started from the next shooting processing.

The multiple exposure shooting necessary/unnecessary setting is automatically changed from "ENABLED" to "DISABLED" under several conditions, which will be described below, such as completion of multiple exposure shooting upon achievement of the scheduled number of images. Even in the middle of the multiple exposure shooting, setting this item to "DISABLED" according to a user's operation brings an end to the multiple exposure shooting at that moment. At this time, if it is possible to generate a file of a multiple image combination result image, the digital camera 100 generates the file of the multiple image combination result image based on the control of the microcomputer 123.

The menu item 302 is a menu item for selecting the number of images to be combined in one set of multiple exposure shooting, and can be set by selecting any number of images from the setting candidates 2 to 9. Without a selection of a base image, which will be described below, the number of images selected at the menu item 302 is set as the number of images scheduled to be shot in multiple exposure shooting. In a case where a base image is selected, the number of images selected at the menu item 302 with the value 1 subtracted therefrom is set as the number of images scheduled to be shot in multiple exposure shooting. The number of images scheduled to be shot in multiple exposure shooting is recorded in the system memory 132. This item cannot be selected and changed when multiple exposure shooting is not completed after one or more image is shot in the multiple exposure shooting. (Hereinbelow, this state is referred to as "multiple exposure shooting ongoing state". In this state, a multiple exposure shooting ongoing flag is set to 1, as will be described below.)

The menu item 303 is a menu item for selecting whether the automatic exposure adjustment function can be performed in multiple exposure shooting, and can be set by selecting any of two setting candidates "ENABLED" or "DISABLED". If a user sets the automatic exposure adjustment function to "ENABLED", the digital camera 100 is set to perform the addition processing according to the above-described automatic exposure adjustment mode when generating a multiple image combination result image to be recorded in the recording medium 120. If a user sets the automatic exposure adjustment function to "DISABLED", the digital camera 100 is set to perform the addition processing according to the above-described additive mode when generating a multiple image combination result image to be recorded in the recording medium 120. This item cannot be selected and changed in the multiple exposure shooting ongoing state.

The menu item 304 is a menu item for selecting a base image in multiple exposure shooting, and can be set by selecting one image as a base image from images recorded in the recording medium 120 (images stored before the multiple exposure shooting mode is set). This item can be set only when the multiple exposure shooting necessary/unnecessary setting is set to "ENABLED", and the digital camera 100 is not in the multiple exposure shooting ongoing state. In other words, a user can set a base image at the menu item 304 only during a period since the multiple exposure shooting necessary/unnecessary setting is set to "ENABLED" until the first image is shot.

When the base image is set, the screen illustrated in FIG. 3B is displayed. An image 306 is an image set as the base image from the images recorded in the recording medium 120. The base image is read out from the recording medium 120 by the video signal processing circuit 116 when one or more image is shot in the multiple exposure shooting mode or when a live view display is started, and is loaded onto the buffer memory 122 in a state converted as developed data.

When the base image is selected, a setting value of an image size as a shooting condition (the image size of images to be shot in multiple exposure shooting after that) is set to the same value as the image size of the base image. Selecting the base image in this way enables execution of multiple exposure shooting with use of a previously shot image as the first captured image.

According to the present exemplary embodiment, the digital camera 100 is configured in such a manner that only an image previously shot by the digital camera 100 itself can be selected as a base image for the necessity of maintaining consistency of an image size. However, the digital camera 100 may be configured in such a manner that even an image other than images shot by the digital camera 100 can be selected as a base image as long as the image has an image size settable as a shooting condition in the digital camera 100. Alternatively, the digital camera 100 may be configured in such a manner that even an image having an image size that is not settable as a shooting condition in the digital camera 100 can be set as a base image after the video signal processing circuit 116 resizes that image.

The setting of a base image is canceled upon completion of the multiple exposure shooting, and the digital camera 100 is returned to a state with no base image selected. A cancel image selection button 305 is a button icon for canceling a selected base image, and selecting and pressing this button brings back the digital camera 100 to a state with no base image selected.

Data stored in the buffer memory 122 during multiple exposure shooting will be described with reference to FIGS. 4A to 4E. The buffer memory 122 stores five types of image data, namely, developed data, high-precision data, multiple image developed data, display multiple image data, and previous shooting display multiple image data at most, according to shooting.

The developed data is data generated by applying development processing such as color processing on an image signal acquired from the image sensor 112 at the time of immediately preceding shooting. An image file of each original image to be recorded in the recording medium 120 is generated by compressing the developed data according to, for example, the JPEG format.

The high-precision data is image data generated by raising the bit rate of the developed data acquired from the previous shooting for multiple image combination by the video signal processing circuit 116 (hereinbelow referred to as "high-precision processing"), and adding it to high-precision data generated until the previous shooting. Applying the high-precision processing can reduce the possibility that gradation may be saturated according to the multiple image combination processing. The high-precision data may be defined as data generated by applying not only the high-precision processing but also another processing for facilitating multiple image combination.

The multiple image developed data is data generated by adding developed data acquired from the current shooting to the high-precision data generated at this time (a combined image of images acquired until the previous shooting). An image file of a multiple image combination result image to be recorded in the recording medium 120 is generated by compressing the multiple image developed data according to, for example, the JPEG format.

The display multiple image data is data generated by reducing or compressing the multiple image developed data for display. This data is used in displays in quick review (hereinbelow also referred to as "QR") and playback processing during the multiple exposure shooting (i.e., multiple exposure shooting ongoing QR/playback processing) and in QR and playback processing of the first image during the multiple exposure shooting (i.e., multiple exposure shooting ongoing first image QR/playback processing), which will be described below. The previous shooting display multiple image data corresponds to the display multiple image data generated in shooting until the previous shooting. A multiple image combination and multiple image combination result image may refer to an image generated by superimposing, composing, synthesizing, or merging images by way of example and not of limitation. Multiple image combination and multiple image combination result image do not refer to synthesizing a plurality of images that are placed in a tile-arranged configuration such as is done for a panoramic effect. Multiple image combination and multiple image combination result image may be referred to as multiple-synthesize image, multiple-composite image, multiple image combination image, or multiple-composite image.

FIGS. 4A to 4D illustrates data stored in the buffer memory 122 in each state with no base image selected during multiple exposure shooting.

FIG. 4A illustrates the state of the buffer memory 122 after shooting of a first image. After an image signal A is acquired from the shooting of the first image, developed data A generated by developing the image signal A is stored in the buffer memory 122. However, at this time, the high-precision data, the multiple image developed data, the display multiple image data, and the previous shooting display multiple image data are neither generated nor stored, and the buffer memory 122 has a free space for storing these types of data. Therefore, it is possible to increase the speed of other types of processing by assigning, to the other processing, the capacity left for storing the high-precision data, the multiple image developed data, the display multiple image data, and the previous shooting display multiple image data. Examples of the other processing include face detection processing with use of live view shooting, and contrast AF processing.

FIG. 4B illustrates the state of the buffer memory 122 after shooting of a second image. After an image signal B is acquired from the shooting of the second image, developed data B is generated by developing the image signal B, and is stored in the buffer memory 122. Further, the high-precision processing is applied to the developed data A stored after the shooting of the first image to generate high-precision data A, which is then stored in the buffer memory 122 (the addition is omitted since no high-precision data is stored after the shooting of the first image). The high-precision data A and the developed data B are combined to generate multiple image developed data A+B, which is then stored in the buffer memory 122. The multiple image developed data A+B is reduced in size or compressed to generate display multiple image data A+B, which is then stored in the buffer memory 122. At the time of the shooting of the second image, previous shooting display multiple image data is generated from the image file of the first image A recorded in the recording medium 120, since no display multiple image data is generated at the time of the shooting of the first image. Then, the generated previous shooting display multiple image data is stored in the buffer memory 122.

FIG. 4C illustrates the state of the buffer memory 122 after shooting of a third image. After an image signal C is acquired from the shooting of the third image, developed data C is generated by developing the image signal C, and is then stored in the buffer memory 122. Further, the high-precision processing is applied to the developed data B stored after the shooting of the second image, which is then added to the high-precision data A stored after the shooting of the second image. In this way, high-precision data A+B is generated and stored in the buffer memory 122. The high precision data A+B and the developed data C are combined to generate multiple image developed data A+B+C, which is then stored in the buffer memory 122. The multiple image developed data A+B+C are reduced in size or compressed to generate display multiple image data A+B+C, which is then stored in the buffer memory 122. The display multiple image data A+B generated at the time of the shooting of the second image is stored as previous shooting display multiple image data A+B.

FIG. 4D illustrates the state of the buffer memory 122 when the image acquired from the shooting of the third image is discarded by the multiple exposure shooting ongoing QR/playback processing, which will be described below. Discard of the image acquired from the shooting of the third image results in deletion of the developed data C, the multiple image developed data A+B+C, and the display multiple image data A+B+C from the buffer memory 122 in the state illustrated in FIG. 4C. Further, the image data stored as the previous shooting display multiple image data A+B in the state illustrates in FIG. 4C is stored as the display multiple image data A+B in the state illustrated in FIG. 4D.

FIG. 4E illustrates the state of the buffer memory 122 when the third image is shot again after the discard of the shot third image. After an image signal D is acquired from the reshooting of the third image (shooting in the multiple exposure shooting mode after a reshooting instruction is received), developed data D is generated by developing the image signal D, and is then stored in the buffer memory 122. Further, the high-precision data A+B, which is stored after the discard of the third image, is kept stored in the buffer memory 122 as it is. The high precision data A+B and the developed data D are combined to generate multiple image developed data A+B+D, which is then stored in the buffer memory 122. The multiple image developed data A+B+D is reduced in size or compressed to generate display multiple image data A+B+D, which is then stored in the buffer memory 122. The display multiple image data A+B, which is kept stored after the discard of the third image, is stored in the buffer memory 122 as previous shooting display multiple image data A+B.

Next, data for use in the multiple exposure shooting processing will be described. The multiple exposure shooting processing is performed with use of the following variables.

Multiple exposure shooting necessary/unnecessary setting: This variable can be set to any of "necessary" or "unnecessary", and the setting value thereof is recorded in the non-volatile memory 130 or the system memory 132. If this variable is set to "necessary", this indicates that the digital camera 100 is now in the multiple exposure shooting mode.

Multiple exposure shooting ongoing flag: This is a variable indicating whether multiple exposure shooting is now being performed, and is recorded in the system memory 132. After the multiple exposure shooting necessary/unnecessary setting is set to "necessary", shooting of one or more image sets the flag to 1 (the multiple exposure shooting ongoing state), and completion of the multiple exposure shooting sets the flag to 0. The flag can be used to determine, for example, whether normal processing or processing during multiple exposure shooting is employed as processing in a quick review.

Number of images scheduled to be shot in multiple exposure shooting: This is a value indicating the number of times of multiple exposure shooting performed to generate one multiple image combination result image (hereinbelow referred to as "one set of multiple exposure shooting"), and is recorded in the system memory 132. In a case where the digital camera 100 is not set to use a base image, the number of images scheduled to be shot in multiple exposure shooting is equal to the number set at the menu item 302 illustrated in FIG. 3. In a case where the digital camera 100 is set to use a base image, the number of images scheduled to be shot in multiple exposure shooting is equal to the number set at menu item 302 illustrated in FIG. 3 with the value 1 subtracted therefrom.

Number of images completed in multiple exposure shooting: This is a value indicating the number of images that have been shot up to that time in one set of multiple exposure shooting, and is recorded in the system memory 132. When the number of images completed in multiple exposure shooting reaches the number of images scheduled to be shot in multiple exposure shooting, this means that one set of multiple exposure shooting is completed, and therefore the multiple exposure shooting processing is ended.

Enlargement mode flag: This is a variable for managing the state whether the digital camera 100 is in an enlargement mode for enlarging an image in the live view display, and is recorded in the system memory 132. According to the pressing of the enlargement button 23, the enlargement mode is sequentially switched among an enlargement OFF mode (a whole through-the-lens image is displayed on an entire screen), an enlargement mode (five times enlargement), and an enlargement mode (ten times enlargement).

In the multiple exposure shooting ongoing state, information indicating a storage location on the recording medium 120 of each original image that has been shot up to that time in one set of the multiple exposure shooting is recorded in the system memory 132 as already written file information. If there is a plurality of recording media to record an image, information specifying the recording medium of the storage destination is also recorded therewith.

Figure 5B:
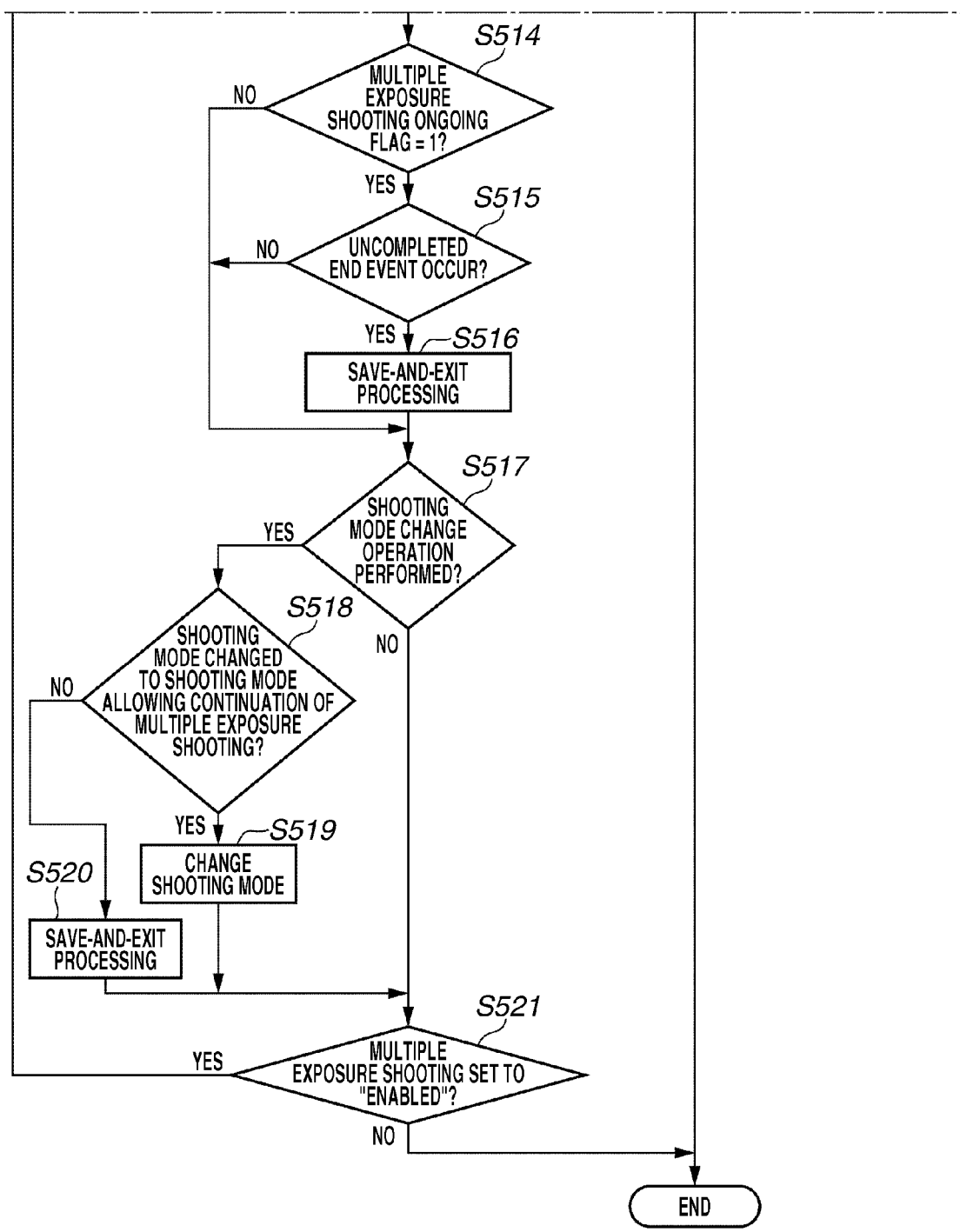
FIG. 5 (including FIGS. 5A and 5B) is a flowchart illustrating multiple exposure shooting mode processing.

FIG. 5 (including FIGS. 5A and 5B) is a flowchart illustrating the multiple exposure shooting mode processing. The microcomputer 123 develops the program recorded in the non-volatile memory 130 onto the system memory 132 to execute it, by which the processing illustrated in FIG. 5 can be realized. When the multiple exposure shooting necessary/unnecessary setting is set to "necessary", the processing illustrated in FIG. 5 is started.

In step S500, the microcomputer 123 determines whether the digital camera 100 receives an instruction to start the live view display. More specifically, the microcomputer 123 determines whether the live view button 27 is pressed. If the microcomputer 123 determines that the live view button 27 is pressed (the digital camera 100 receives an instruction for the live view display) (YES in step S500), the processing proceeds to step S530, whereas if not (NO in step S500), the processing proceeds to step S501. In step S530, the microcomputer 123 performs multiple exposure shooting mode processing (LV) while providing the live view display, which will be described below with reference to FIG. 8.

In step S501, the microcomputer 123 determines whether the SW2 is turned on. If the SW2 is turned on (YES in step S501), the processing proceeds to step S502, and if the SW2 is not turned on (NO in step S501), the processing proceeds to step S507.

In step S502, the microcomputer 123 performs the multiple exposure shooting processing. The details of the multiple exposure shooting processing will be described below with reference to FIG. 6.

In step S503, the microcomputer 123 refers to the system memory 132 to determine whether the number of images completed in multiple exposure shooting completion is 1. In other words, the microcomputer 123 determines whether the first image in one set of multiple exposure shooting has been shot in the multiple exposure shooting processing performed in step S502.

If the number of images completed in multiple exposure shooting is 1 (YES in step S503), the processing proceeds to step S504, in which the microcomputer 123 sets and stores 1 as the multiple exposure shooting ongoing flag in the system memory 132. If the microcomputer 123 determines in step S503 that the number of images completed in multiple exposure shooting is not 1 (NO in step S503), or if the microcomputer 123 sets the multiple exposure shooting ongoing flag to 1 in step S504, the processing proceeds to step S505.

In step S505, the microcomputer 123 determines whether the number of images completed in multiple exposure shooting stored in the system memory 132 reaches the number of images scheduled to be shot in multiple exposure shooting. If the number of images completed in multiple exposure shooting reaches the number of images scheduled to be shot in multiple exposure shooting (YES in step S505), this means that one set of multiple exposure shooting is completed. Therefore, the processing proceeds to step S506, in which the microcomputer 123 performs "save-and-exit processing", and then ends the multiple exposure shooting mode processing.

In the "save-and-exit processing" in step S506, the microcomputer 123 ends the multiple exposure shooting at this time, generates a multiple image combination result image with use of images acquired until this time, and records the generated image in the recording medium 120 as an image file. At this time, the microcomputer 123 generates the multiple image combination result image according to the setting of the automatic exposure adjustment function set in the menu screen illustrated in FIG. 3. If the automatic exposure adjustment function is set to "ENABLED", the microcomputer 123 performs the multiple image combination processing based on the above-described equation (4). If the automatic exposure adjustment function is set to "DISABLED", the microcomputer 123 performs the multiple image combination processing based on the above-described equation (3).

Further, the microcomputer 123 initializes multiple exposure shooting. According to the initialization, the microcomputer 123 discards all image data pieces recorded in the buffer memory 122. Then, the microcomputer 123 resets the number of images scheduled to be shot in multiple exposure shooting and the number of images completed in multiple exposure shooting, which are recorded in the system memory 132. The microcomputer 123 changes the multiple exposure shooting necessary/unnecessary setting to "unnecessary". Further, the microcomputer 123 sets the multiple exposure shooting ongoing flag stored in the system memory 132 to 0. Then, the microcomputer 123 deletes all of the contents of the already written file information stored in the system memory 132.

In step S507, the microcomputer 123 determines whether the playback button 18 is pressed (whether the digital camera 100 receives an instruction to shift to the playback mode). If the playback button 18 is pressed (YES in step S507), the processing proceeds to step S508. If the playback button 18 is not pressed (NO in step S507), the processing proceeds to step S514.

In step S508, the microcomputer 123 refers to the system memory 132 to determine whether the multiple exposure shooting ongoing flag is 1 (whether the digital camera 100 is in the multiple exposure shooting ongoing state). If the multiple exposure shooting ongoing flag is 1 (YES in step S508), the processing proceeds to step S510. If the multiple exposure shooting ongoing flag is not 1 (NO in step S508), the processing proceeds to step S509.

In step S509, the microcomputer 123 performs normal playback mode processing. During the normal playback mode processing, the microcomputer 123 applies the playback mode processing such as a one image display, a multiple image display, image advancing, deletion, and attribute addition to all images that are recorded in the recording medium 120 and can be played back by the digital camera 100.

In step S510, the microcomputer 123 determines whether the digital camera 100 is set to use a base image. If the digital camera 100 is not set to use a base image (NO in step S510), the processing proceeds to step S511. If the digital camera is set to use a base image (YES in step S510), the processing proceeds to step S513.

In step S511, the microcomputer 123 determines whether the number of images completed in multiple exposure shooting recorded in the system memory 132 is two or more. If the microcomputer 123 determines that the number is two or more (YES in step S511), the processing proceeds to step S513. If the number is less than two (NO in step S511), the processing proceeds to step S512. Since the multiple exposure shooting ongoing flag is 1 in this case, the fact that the number of images completed in multiple exposure shooting is less than two at this time means that the number of images completed in multiple exposure shooting is 1.

In step S512, the microcomputer 123 performs multiple exposure shooting ongoing first image QR/playback processing. The multiple exposure shooting ongoing first image QR/playback processing is display processing allowing a user to check the first image shot after the digital camera 100 starts the multiple exposure shooting mode, and does not include a display of an image captured before the digital camera 100 starts the multiple exposure shooting mode. During the multiple exposure shooting ongoing first image QR/playback processing, the digital camera 100 displays the first image shot after the digital camera 100 starts the multiple exposure shooting mode on the display member 118.

Figure 7A:
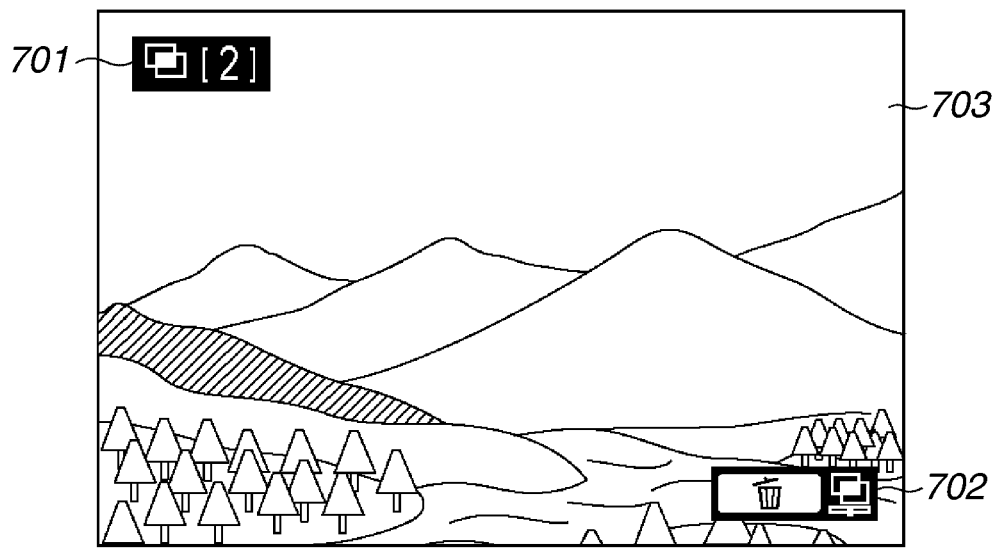
FIGS. 7A and 7B each illustrate a display example in quick review/playback processing during multiple exposure shooting.

FIG. 7A illustrates an example of a screen displayed on the display member 118 by the multiple exposure shooting ongoing first image QR/playback processing during multiple exposure shooting (display control). FIG. 7A illustrates a display example when the digital camera 100 is set to combine three images in multiple exposure shooting at the above-described menu item 302 and to use no base image at the above-described menu item 304 illustrated in FIG. 3.

A display item 701 includes an icon indicating that the image is acquired by multiple exposure shooting. Further, the display item 701 indicates that two more images can be shot to reach the number of images scheduled to be shot in multiple exposure shooting. A display item 702 is a guide display indicating that an operation selection dialog can be displayed by pressing the deletion button 19. An image 703 is an image without any image combined therewith yet, since the digital camera 100 has shot only one image until this time.

A user views the displayed image, and starts the next shooting in the multiple exposure shooting if there is no problem in the displayed image. If the user wants to perform some operation, the user presses the deletion button 19 to display the operation selection dialog. The operation selection dialog may include at least "back to previous image", "save and exit", and "exit without saving" as operation options.

If the user selects "back to previous image", the user can delete the displayed first image, and restart multiple exposure shooting while maintaining the current settings regarding multiple exposure shooting which are set in the menu screen illustrated in FIG. 3. If the user selects "save and exit", the digital camera 100 ends the multiple exposure shooting mode at this point. If the user selects "exit without saving", the digital camera 100 ends the multiple exposure shooting mode at this point without recording the displayed first image into the recording medium 120 (or while deleting it from the recording medium 120). When the digital camera 100 performs "save-and-exit processing" or "exit-without-saving processing", the digital camera 100 sets the multiple exposure shooting ongoing flag recorded in the system memory 132 to zero, and sets the multiple exposure shooting necessary/unnecessary setting to "unnecessary".

In step S513, the microcomputer 123 performs the multiple exposure shooting ongoing QR/playback processing. The multiple exposure shooting ongoing QR/playback processing is display processing allowing a user to check images acquired after the digital camera 100 shifts to the multiple exposure shooting mode, and how they are combined by multiple image combination. The processing does not include a display of an image captured before the digital camera 100 shifts to the multiple exposure shooting mode, other than a base image.

Figure 7B:
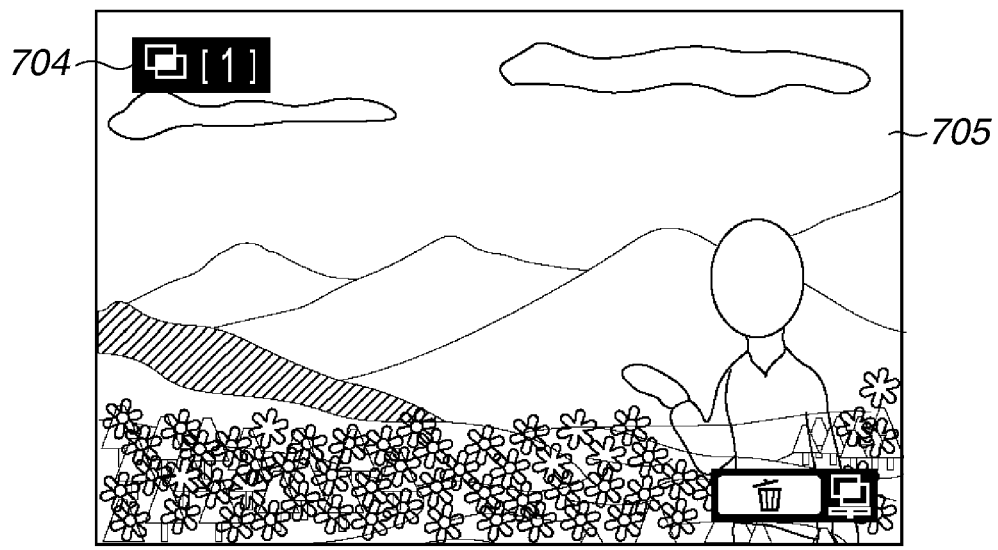

FIG. 7B illustrates an example of a screen displayed on the display member 118 by the multiple exposure shooting ongoing QR/playback processing during multiple exposure shooting (display control). As is the case with the screen illustrated in FIG. 7A, the screen illustrated in FIG. 7B is a display example when the digital camera 100 is set to combine three images in multiple exposure shooting at the above-described menu item 302 and to use no base image at the above-described menu item 304 illustrated in FIG. 3. Further, this example is a display example after a second image is shot.

The representation of the display item 704 is the same as the display item 701 illustrated in FIG. 7A, and indicates that the number of remaining images is reduced by one and one more image can be shot to reach the number of images scheduled to be shot in multiple exposure shooting. An image 705 is generated by combining the first image and the second image acquired from shooting at this time. In other words, the image 705 displays the display multiple image data A+B illustrated in FIG. 4B.

The display multiple image data is an image generated by reducing the size of the multiple image combination result image generated from the multiple image combination of images captured from a start of the multiple exposure shooting mode until then, including a base image if the digital camera 100 is set to use the base image, using the equation (3) or (4) according to the mode. More specifically, the multiple exposure shooting is ended at this point and a multiple image combination result image is generated by the processing (save-and-exit processing) for generating a multiple image combination result image to be recorded in the recording medium 120 with use of images acquired until this time. The display multiple image data is an image generated from the multiple image combination at a same composition ratio as that of the generated multiple image combination result image.

A user views the displayed image, and starts the next shooting in the multiple exposure shooting if there is no problem in the displayed image. If the user wants to perform some operation, the user presses the deletion button 19 to display the operation selection dialog. The operation selection dialog may include at least "back to previous image", "save and exit", and "exit without saving" as operation options.

If the user selects "back to previous image", the user can delete only one image shot immediately before, and restart the multiple exposure shooting from the previous image. If the user selects "save and exit", the digital camera 100 ends the multiple exposure shooting at this point, and generates a multiple image combination result image with use of the images acquired until this time to record it in the recording medium 120. If the user selects "EXIT WITHOUT SAVING", the digital camera 100 ends the multiple exposure shooting mode at this point without recording the multiple image combination result image generated with use of the images acquired until this time in the recording medium 120. When the digital camera 100 performs "save-and-exit processing" or "exit-without-saving processing", the digital camera 100 sets the multiple exposure shooting ongoing flag recorded in the system memory 132 to zero, and sets the multiple exposure shooting necessary/unnecessary setting to "unnecessary".

In step S14, the microcomputer 123 refers to the system memory 132 to determine whether the multiple exposure shooting ongoing flag is set to 1. If the multiple exposure shooting ongoing flag is set to 1 (YES in step S514), the processing proceeds to step S515. If the multiple exposure shooting ongoing flag is not set to 1 (NO in step S514), the processing proceeds to step S517.

In step S515, the microcomputer 123 determines whether there is any uncompleted end event. The uncompleted end event is an event causing the digital camera 100 to terminate the multiple exposure shooting mode in the middle of the processing, and examples thereof include the following events.

- Event that changes the multiple exposure shooting necessary/unnecessary setting to "unnecessary" according to a user's operation
- Event that makes the power source turned off, such as a user's operation on the main SW 20, opening of the card cover 28, opening of the battery cover 29, or passage of the auto power-off time.
- Event that makes continuation of multiple exposure shooting impossible according to the conditions of shooting settings. If there is an uncompleted end event (YES in step S515), the processing proceeds to step S516. If there is no uncompleted end event (NO in step S515), the processing proceeds to step S517.

In step S516, the microcomputer 123 performs the "save-and-exit processing". This processing is the same as the above-described processing performed in step S506.

In step S517, the microcomputer 123 determines whether there is an operation for changing the shooting mode. At this time, the operation to be determined by the microcomputer 123 is not an operation for directly changing the multiple exposure shooting necessary/unnecessary setting, but an operation for rotating the shooting mode dial 14. If the microcomputer 123 determines that the digital camera 100 receives an operation for changing the shooting mode (YES in step S517), the processing proceeds to step S518, whereas if not (NO in step S517), the processing proceeds to step S521.

In step S518, the microcomputer 123 determines whether the shooting mode after the change by the operation for changing the shooting mode is a shooting mode (a first shooting mode) predetermined as a shooting mode allowing continuation of the multiple exposure shooting mode processing.

According to the present exemplary embodiment, the shooting modes allowing continuation of the multiple exposure shooting mode processing, among the shooting modes to which a user can change the mode by operating the shooting mode dial 14, areas follows: a manual mode; a shutter speed priority mode; a diaphragm priority mode; a program automatic exposure (AE) mode; and a valve mode.

On the contrary, the shooting modes prohibiting continuation of the multiple exposure shooting mode processing (a second shooting mode), among the shooting modes to which a user can change the mode by operating the shooting mode dial 14, are as follows: a full automatic mode; a flash emission prohibition mode; a creative full automatic mode; a portrait mode; a scenery mode, a close-up mode, a sports mode, a night scene portrait mode; and a moving image mode. The reason to classify the shooting modes into the one allowing continuation of multiple exposure shooting and the other in this way will be described below.

If the microcomputer 123 determines in step S518 that the changed shooting mode is the shooting mode allowing continuation of the multiple exposure shooting mode processing (YES in step S518), the processing proceeds to step S519. Whereas if not (NO in step S518), the processing proceeds to step S520.

In step S519, the microcomputer 123 switches the shooting mode according to the operation of the shooting mode dial 14, and continues the multiple exposure shooting mode processing. At this time, the microcomputer 123 maintains the multiple exposure shooting necessary/unnecessary setting, the multiple exposure shooting ongoing flag, the number of images scheduled to be shot in multiple exposure shooting, the number of images completed in multiple exposure shooting, the already written file information, and the base image (if the digital camera 100 is set to use a base image) without changing them.

In step S520, the microcomputer 123 performs the "save-and-exit processing". This processing is the same as the above-described processing performed in step S506. However, if the digital camera 100 does not yet have enough images to generate a multiple image combination result image, the microcomputer 123 does not generate a multiple image combination result image. Due to the execution of the "save-and-exit processing" at this time, determination in the subsequent step S521 will be NO, and therefore the multiple exposure shooting mode processing is automatically ended according to the operation of the shooting mode dial 14. At this time, a screen indicating that the multiple exposure shooting mode processing is automatically ended (the multiple exposure shooting mode is canceled) may be displayed on the display member 118. After the multiple exposure shooting mode is ended, the microcomputer 123 switches the shooting mode according to the operation of the shooting mode dial 14.

In step S521, the microcomputer 123 refers to the multiple exposure shooting necessary/unnecessary setting in the system memory 132 or the non-volatile memory 130, and determines whether multiple exposure shooting is set to "ENABLED". If multiple exposure shooting is set to "ENABLED" (YES in step S521), the processing returns to step S500, and the processing is repeated. If multiple exposure shooting is set to "DISABLED" (NO in step S521), the multiple exposure shooting mode processing is ended.

Now, a description will be given of the reason to classify the shooting modes into the one allowing continuation of multiple exposure shooting and the other in the above-described manner.

A multiple image combination result image generated from multiple exposure shooting is not an image faithfully representing a reality, since it is an image generated by adding and combining a plurality of images. In other words, multiple exposure shooting is a shooting method utilized as a kind of method for expressing a photographer's idea rather than a shooting method for accurately recording a reality. Therefore, it is desirable to allow a photographer to adjust shooting conditions as much as possible during multiple exposure shooting, since in this case, the photographer can have a wider variety of options for expression. Therefore, shooting modes allowing a photographer to adjust more shooting conditions are classified as the modes allowing continuation of multiple exposure shooting.

In other words, the shooting modes allowing continuation of the multiple exposure shooting include more items of the shooting conditions that can be set to a value specified by a user than the shooting modes prohibiting continuation of the multiple exposure shooting. Further, even in the middle of multiple exposure shooting, the shooting mode can be switched as long as the mode is classified into the shooting modes allowing continuation of the multiple exposure shooting. Therefore, it is possible to generate a multiple image combination result image by combining images shot under different shooting modes from each other, and the range of expression can be further extended.

Further, it is especially desirable for the digital camera 100 to be able to adjust luminance of each image to be added in multiple exposure shooting. This is because multiple exposure shooting is characterized in that a plurality of images is combined by adding the luminance of each image, and therefore, the luminance may unintentionally become saturated before long in the additive mode without adjusting the luminance of each image. Further, even in another mode than the additive mode, an issue may be raised without an adjustment of the luminance of each image. For example, if an image has excessively high luminance compared to other images to be combined, this may result in generation of a multiple image combination result image with only that image standing out from the other images. On the contrary, if an image has excessively low luminance compared to other images to be combined, this may result in generation of a multiple image combination result image with only that image too inconspicuous. Therefore, shooting modes allowing a user to set at least one value of an exposure correction, a shutter speed, and a diaphragm value, which affect the luminance value of each image, and ISO sensitivity, are classified as the shooting modes allowing continuation of the multiple exposure shooting mode processing.

Further, shooting modes allowing an adjustment of white balance are classified as the shooting modes allowing continuation of the multiple exposure shooting mode processing, to enable colors to be adjusted based on comparison among a plurality of images to be combined.

The shooting modes satisfying the above-described requirements as the shooting modes allowing continuation of the multiple exposure shooting mode processing (the first shooting mode) are the manual mode, the shutter speed priority mode, the diaphragm priority mode, the program AE mode, and the valve mode.

In the manual mode, a shutter speed, a diaphragm value, ISO sensitivity, an exposure correction, and white balance can be set to values determined by a user. In the shutter speed priority mode, a shutter speed, ISO sensitivity, an exposure correction, and white balance can be set to values determined by a user. In this mode, the diaphragm value is automatically set by the microcomputer 123 to achieve an appropriate exposure according to the shooting conditions set by a user.

In the diaphragm priority mode, a diaphragm value, ISO sensitivity, an exposure correction, and white balance can be set to values determined by a user. In this mode, the shutter speed is automatically set by the microcomputer 123 to achieve an appropriate exposure according to the shooting conditions set by a user. In the program AE mode, ISO sensitivity, an exposure correction, and white balance can be set to values determined by a user. In this mode, the shutter speed and the diaphragm value are automatically set by the microcomputer 123 to achieve an appropriate exposure according to the shooting conditions set by a user. In the valve mode, a diaphragm value, ISO sensitivity, white balance, and the like can be set to values determined by a user.

On the other hand, the shooting modes prohibiting continuation of the multiple exposure shooting mode processing (the second shooting mode) are shooting modes providing less shooting conditions that a user can specify than the above-described shooting modes allowing continuation of the multiple exposure shooting mode processing. Especially, shooting modes in which a user cannot adjust at least one value of an exposure correction, a shutter speed, and a diaphragm value, which affect the luminance value of each image, ISO sensitivity, and white balance (they are automatically set) are classified into the shooting modes prohibiting continuation of the multiple exposure shooting mode processing.

Examples of these shooting modes include the full automatic mode, the flash emission prohibition mode, the creative full automatic mode, the portrait mode, the scenery mode, the close-up mode, the sports mode, the night scene portrait mode, and the moving image mode. In these shooting modes, most of the shooting conditions are automatically set by the microcomputer 123, and there are few items of the shooting conditions that a user can set.

If a user changes the shooting mode to one of these shooting modes during multiple exposure shooting, the microcomputer 123 automatically ends the multiple exposure shooting mode processing, accordingly it is possible to prevent the user from performing multiple exposure shooting in a shooting mode unsuitable to the multiple exposure shooting. Further, for an advanced photographer who knows that these shooting modes are not suitable to multiple exposure shooting, an operation of switching the shooting mode to one of these shooting modes during multiple exposure shooting means that the photographer does not want to continue the multiple exposure shooting. Therefore, the photographer's time and effort for ending the multiple exposure shooting mode can be saved by automatically ending the multiple exposure shooting mode according to an operation of changing the shooting mode to one of the shooting modes unsuitable to multiple exposure shooting, like the present exemplary embodiment.

In addition, these shooting modes, in which many shooting conditions are automatically set, are often selected by novice users. As described above, a multiple image combination result image acquired from multiple exposure shooting is not an image faithfully representing a reality. Therefore, a novice user, who does not understand the mechanism of multiple exposure shooting, is likely to misunderstand that a low-quality image is captured or a kind of malfunction occurs. To solve such an issue, the present exemplary embodiment prohibits execution of multiple exposure shooting in the shooting modes that novice users often select, thereby preventing a user from misunderstanding that a multiple image combination result image acquired from multiple exposure shooting is a low-quality image or a malfunction occurs.

According to the present exemplary embodiment, a shooting mode is classified into the shooting mode allowing continuation of multiple exposure shooting or the other in the above-described way, so that a user can perform effective multiple exposure shooting while making full use of a wider range of expressions.

Figure 6:
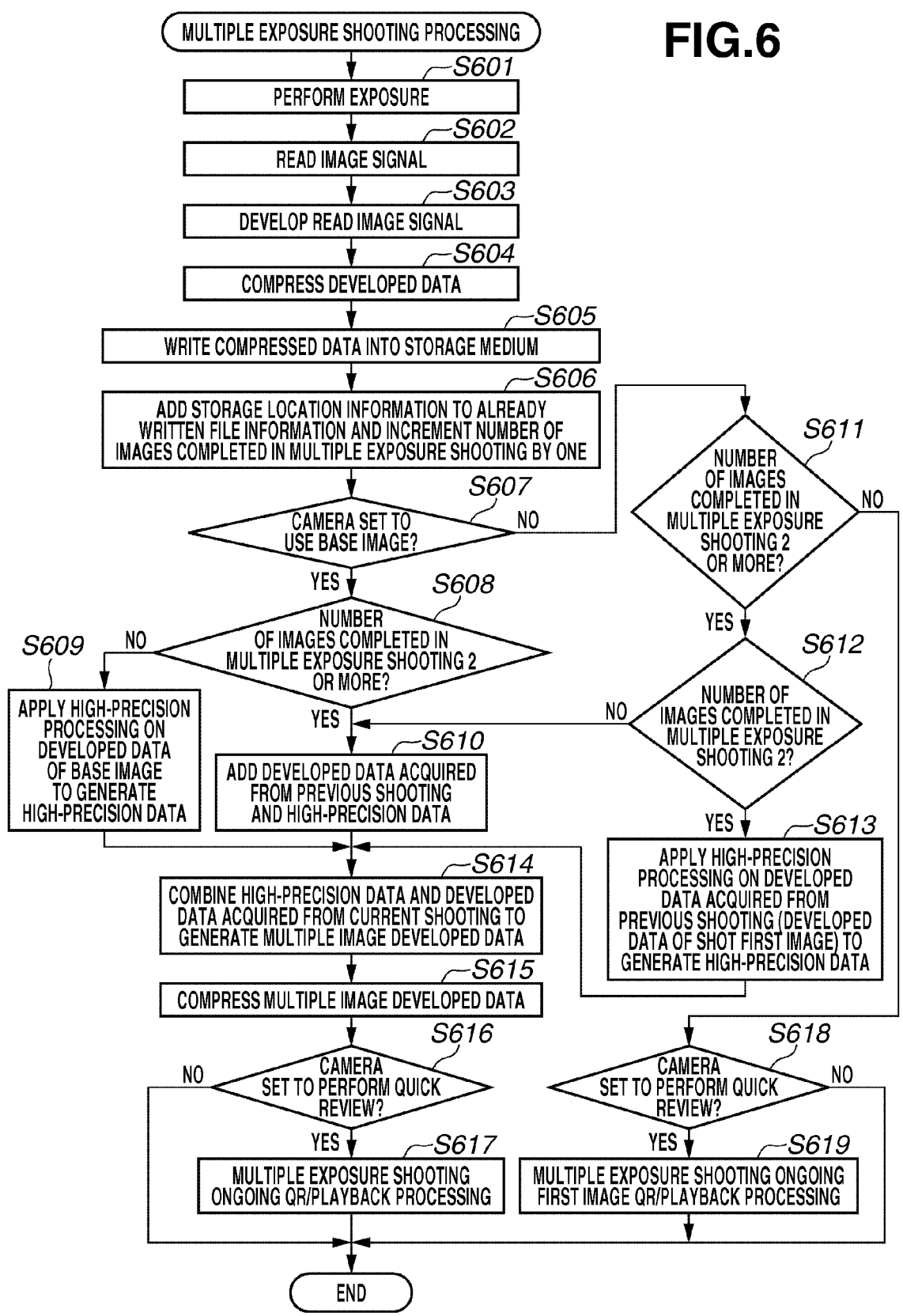
FIG. 6 is a flowchart illustrating multiple exposure shooting processing.

FIG. 6 is a flowchart illustrating the above-described multiple exposure shooting processing performed in step S502 illustrated in FIG. 5. The microcomputer 123 develops the program recorded in the non-volatile memory 130 onto the system memory 132 and executes it, by which the processing illustrated in FIG. 6 can be realized. The shooting processing illustrated in FIG. 6 will be referred to as "actual shooting" to distinguish it from shooting processing for acquiring a through-the-lens image, which will be described below.

In step S601, the microcomputer 123 controls the power source to supply power if the image sensor 112 and the AD converter 115 are in a power save mode. Further, the microcomputer 123 controls an exposure. After completion of the exposure, in step S602, the microcomputer 123 reads out an image signal stored in the image sensor 112, and controls the AD converter 115 to convert the image signal into a digital signal.

In step S603, the microcomputer 123 instructs the video signal processing circuit 116 to generate developed data from the image signal readout in step S602. As described above with reference to FIG. 4, the generated developed data is stored in the buffer memory 122.

In step S604, the microcomputer 123 causes the video signal processing circuit 116 to compress the developed data generated in step S603. In step S605, the microcomputer 123 records the compressed data into the recording medium 120 as an image file. This image file is not a combined image but an original single image. Subsequently, in step S606, the microcomputer 123 adds information indicating a storage location of the image file recorded in step S605 to the already written file information stored in the system memory 132. Instead of or in addition to the information indicating the storage location of the image file, the microcomputer 123 may add information allowing identification of the image file (for example, a filename). Further, the microcomputer 123 adds 1 to the number of images completed in multiple exposure shooting, which is stored in the system memory 132.

In step S607, the microcomputer 123 determines whether the digital camera 100 is set to use a base image. If the digital camera 100 is set to use a base image (YES in step S607), the processing proceeds to step S608. If the digital camera 100 is not set to use a base image (NO in step S607), the processing proceeds to step S611.

In step S608, the microcomputer 123 refers to the system memory 132 to determine whether the number of images completed in multiple exposure shooting is two or more. If the number of images completed in multiple exposure shooting is less than two, i.e., images shot up to that time is only one which has been shot at this time (NO in step S608), the processing proceeds to step S609. If the number of images completed in multiple exposure shooting is two or more (YES in step S608), the processing proceeds to step S610.

In step S609, the microcomputer 123 reads out the base image from the recording medium 120 to acquire developed data of the base image, causes the video signal processing circuit 116 to apply high-precision processing to the developed data of the base image, and stores the high-precision data into the buffer memory 122. The process in step S609 corresponds to a process treating the base image as the image signal A acquired from shooting of the first image illustrated in FIG. 4B, and the image data acquired in step S602 from the shooting at this time as the image signal B acquired from the shooting of the second image illustrated in FIG. 4B.

In step S610, the microcomputer 123 causes the video signal processing circuit 116 to apply high-precision processing to the developed data acquired from the previous shooting, generates high-precision data by adding the high-precision data generated at this time to the high-precision data generated in the previous processing, and stores the resulting high-precision data into the buffer memory 122. In the example illustrated in FIGS. 4A to 4E, this process corresponds to, during shooting of the third image illustrated in FIG. 4C, applying high-precision processing to the developed data B acquired from the shooting of the second image, generating the high-precision data A+B by adding the data B to the high-precision data A generated at the time of shooting of the second image, and storing the generated high-precision data A+B into the buffer memory 122.

On the other hand, in step S611, the microcomputer 123 refers to the system memory 132 to determine whether the number of images completed in multiple exposure shooting is two or more. If the microcomputer 123 determines that the number of images completed in multiple exposure shooting is two or more (YES in step S611), the processing proceeds to step S612. Whereas if the number of images completed in multiple exposure shooting is less than two, i.e., images shot up to that time is only one which has been shot at this time (NO in step S611), the processing proceeds to step S618. When the microcomputer 123 determines in step S611 that the number of images completed in multiple exposure shooting is only one which has been shot at this time, the buffer memory 122 is in the state illustrated in FIG. 4A.

In step S612, the microcomputer 123 determines whether the number of images completed in multiple exposure shooting is two. If the number of images completed in multiple exposure shooting is not two, i.e., if the number of images completed in multiple exposure shooting is three or more (NO in step S612), the processing proceeds to step S610. If the number of images completed in multiple exposure shooting is two (YES in step S612), the processing proceeds to step S613.

In step S613, the microcomputer 123 causes the video signal processing circuit 116 to apply high-precision processing to the developed data acquired from the previous shooting to generate high-precision data, and stores the generated high-precision data into the buffer memory 122. In the example illustrated in FIGS. 4A to 4E, this process corresponds to, during the shooting of the second image illustrated in FIG. 4B, applying high-precision processing to the developed data A acquired from the shooting of the first image, and storing the generated data into the buffer memory 122 as the high-precision data A.

In step S614, the microcomputer 123 causes the video signal processing circuit 116 to combine the high-precision data generated in any of steps S609, S610, and S613, and the developed data acquired from the shooting at this time, which is generated in step S603. In multiple image combination at this time, the images are combined according to the setting of the automatic exposure adjustment function selected on the menu screen illustrated in FIG. 3 based on the above-described equation (3) or (4). At this time, Yn−1 is the luminance of the high-precision data generated in any of steps S609, S610, and S613. Further, yn is the luminance of the developed data acquired from the shooting at this time, which is generated in step S603. The image generated from the multiple image combination is stored into the buffer memory 122 as a multiple image combination result image.

In step S615, the microcomputer 123 causes the video signal processing circuit 116 to reduce or compress the multiple image developed data generated in step S614, and stores the compressed data into the buffer memory 122 as display multiple image data.

In step S616, the microcomputer 123 determines whether the digital camera 100 is set to perform a quick review (QR). Whether to perform a QR immediately after shooting can be set according to a user's operation in advance. If the digital camera 100 is set to perform a QR (YES in step S616), the processing proceeds to step S617, in which the microcomputer 123 performs the multiple exposure shooting ongoing QR/playback processing. The multiple exposure shooting ongoing QR/playback processing is the same as the above-described processing performed in step S513 illustrated in FIG. 5. If the microcomputer 123 determines in step S616 that the digital camera 100 is not set to perform a QR (NO in step S616), or after execution of the processing in step S617, the multiple exposure shooting processing is ended. Then, the processing proceeds to the above-described step S503 illustrated in FIG. 5.

In step S618, the microcomputer 123 determines whether the digital camera 100 is set to perform a quick review (QR). If the digital camera 100 is set to perform a QR (YES in step S618), the processing proceeds to step S619, in which the microcomputer 123 performs the multiple exposure shooting ongoing first image QR/playback processing. The multiple exposure shooting ongoing first image QR/playback processing is the same as the above-described processing performed in step S512 illustrated in FIG. 5. If the microcomputer 123 determines in step S618 that the digital camera 100 is not set to perform a QR (NO in step S618), or after execution of the processing in step S619, the multiple exposure shooting processing is ended. Then, the processing proceeds to the above-described step S503 illustrated in FIG. 5.

Figures 8, 8A, 8B:
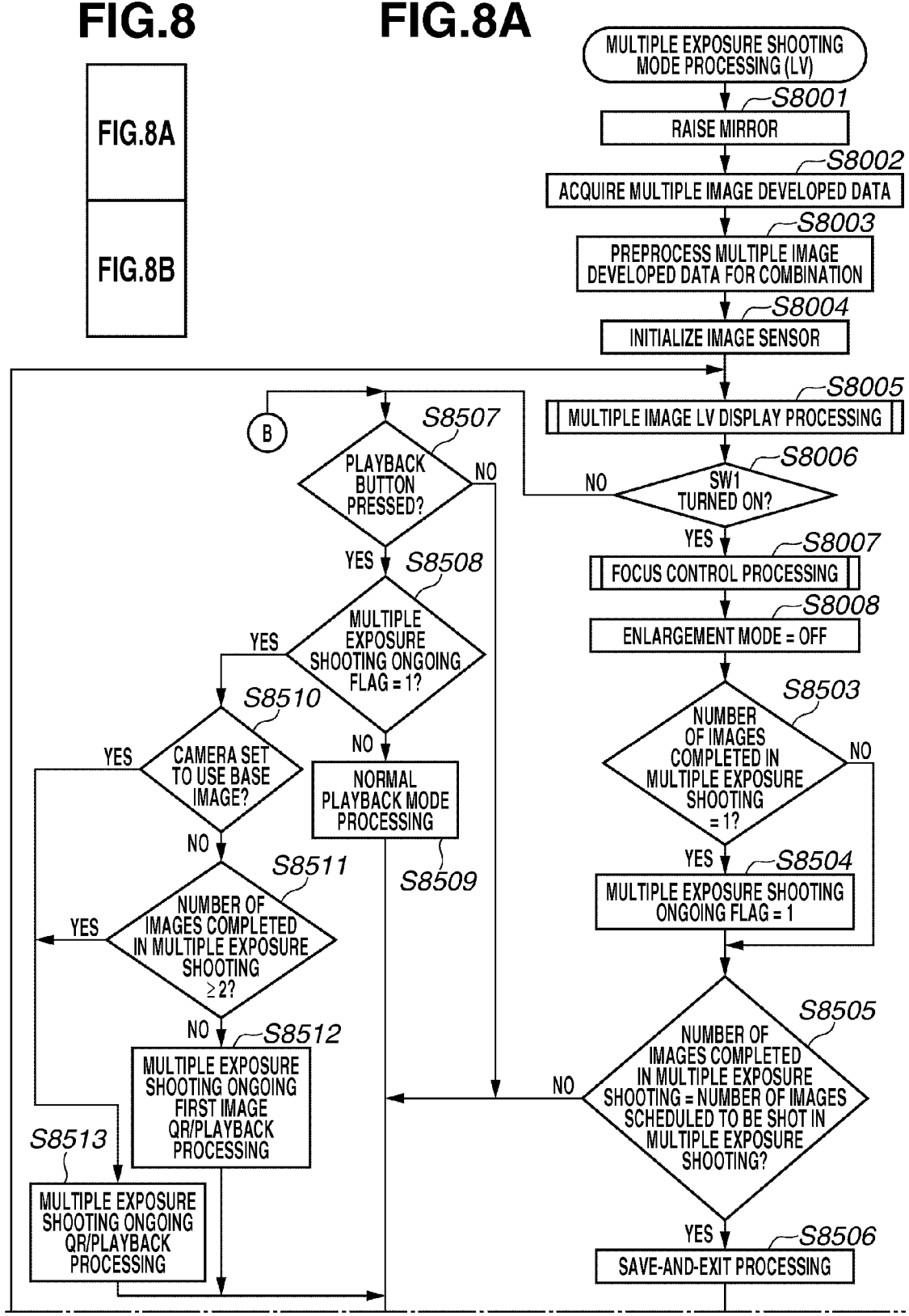
FIG. 8 (including FIGS. 8A and 8B) is a flowchart illustrating multiple exposure shooting mode processing (live view (LV)).
Figure 8B:
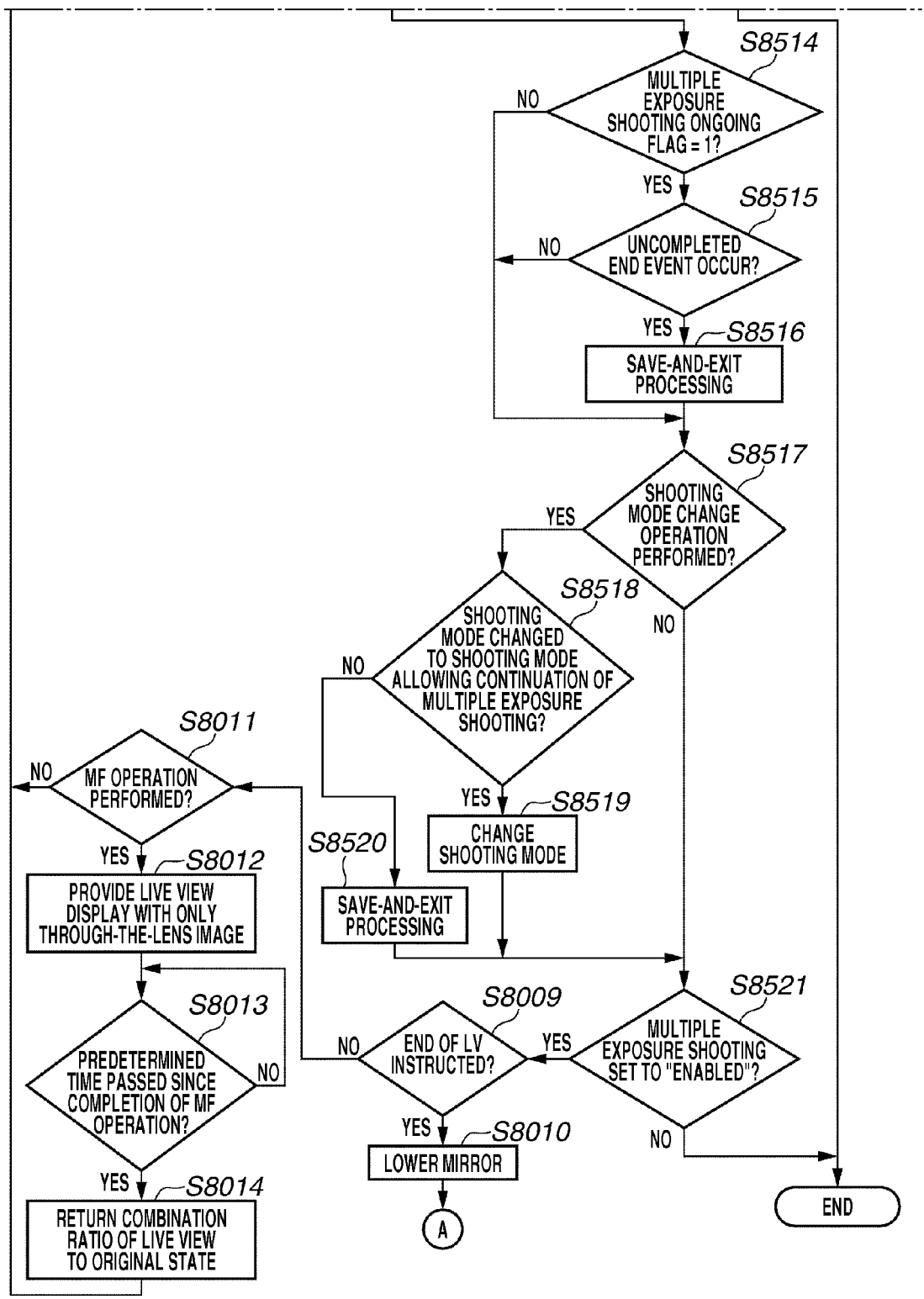

FIG. 8 (including FIGS. 8A and 8B) is a flowchart illustrating the above-described multiple exposure shooting mode processing while providing a live view (LV) in step S530 illustrated in FIG. 5. The microcomputer 123 develops the program recorded in the non-volatile memory 130 onto the system memory 132 and executes it, by which the processing illustrated in FIG. 8 can be realized.

In step S8001, the microcomputer 123 raises the main mirror 105 to guide a light flux of object light to the image sensor 112, i.e., performs mirror-up processing. Further, the microcomputer 123 controls the shutter drive circuit 111 to open the shutter 110.

In step S8002, the microcomputer 123 acquires the multiple image developed data stored in the buffer memory 122. The multiple image developed data is a multiple image combination result image generated by combining images acquired up to that time in one set of multiple exposure shooting (including a base image if the digital camera 100 is set to use a base image).

In step S8003, the microcomputer 123 applies preliminary processing to the multiple image developed data acquired in step S8002 for multiple image composition. Examples of the preliminary processing include the above-described high-precision processing. Further, during the live view display, a multiple image combination result image is only displayed on the display member 118 or an external monitor via the external interface 121 in a full-screen display mode (the same magnification), and therefore, the multiple image developed data is resized to the number of pixels required therefor. As a result, an excessively large processing load may be prevented from being applied to the digital camera 100 due to processing of an excessively large number of pixels.

In step S8004, if the image sensor 112 and the AD converter 115 are in the power save mode, the microcomputer 123 controls the power source to supply power thereto, and initializes the settings for the live view display.

In step S8005, the microcomputer 123 performs multiple image live view display processing. The multiple image live view display processing will be described below with reference to FIG. 9.

In step S8006, the microcomputer 123 determines whether the SW1 is turned on. If the SW1 is turned on (YES in step S8006), the processing proceeds to step S8007. If the SW1 is not turned on (NO in step S8006), the processing proceeds to step S8507. In step S8007, the microcomputer 123 performs focus control processing. The focus control processing will be described below with reference to FIG. 12.

In step S8008, the microcomputer 123 initializes the enlargement mode flag recorded in the system memory 132 to an OFF state. As a result, if the live view display is performed in the enlargement mode before the multiple exposure shooting processing in step S8007, the enlargement display only showing a through-the-lens image is stopped, and is switched to the multiple image live view display, which will be described below.

Processing in steps S8503 to S8521 are similar to those in the above-described steps S503 to S521 illustrated in FIG. 5, so that the descriptions thereof will be omitted here.

In step S8009, the microcomputer 123 determines whether there is an instruction to stop the live view display. More specifically, the microcomputer 123 determines whether the live view button 27 is pressed. If the microcomputer 123 determines that the live view button 27 is pressed (there is an instruction to stop the live view display) (YES in step S8009), the processing proceeds to step S8010. In step S8010, the microcomputer 123 returns the main mirror 105 to the normal position so that the main mirror 105 reflects a light flux to guide it to the finder portion (mirror-down processing). Then, the processing proceeds to step S500 in FIG. 5. If the live view button 27 is not pressed (NO in step S8009), the processing proceeds to step S8011.

In step S8011, the microcomputer 123 determines whether a manual focus (MF) operation is performed. The manual focus operation is, for example, an operation of rotating a focus ring disposed around a lens barrel of the photographic lens 101, by which the focus lens is driven (a focus adjustment operation). The manual focus operation may be not only the operation of the focus ring but also any another operation for a manual focus adjustment. If the microcomputer 123 determines that the MF operation is performed (YES in step S8011), the processing proceeds to step S8012. If the microcomputer 123 determines that the MF operation is not performed (NO in step S8011), the processing returns to step S8005 to repeat the processing.

Figure 11A:
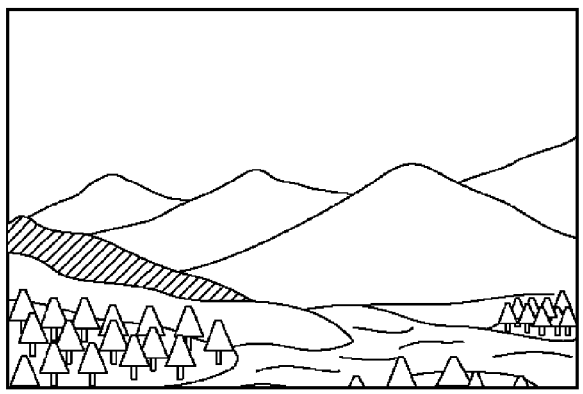
FIGS. 11A to 11D each illustrate a display example in the multiple image live view display processing.
Figure 11B:
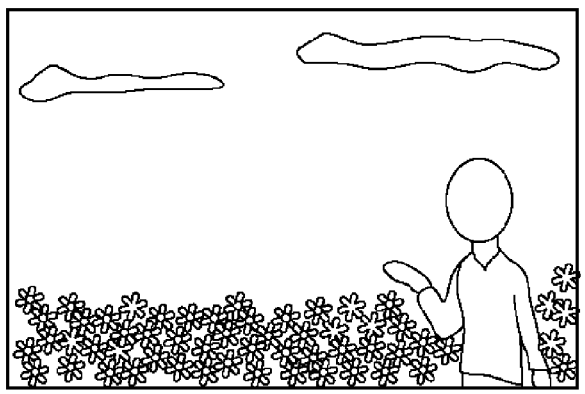

In step S8012, the microcomputer 123 performs the live view display showing only a through-the-lens image on the display member 118 or the external monitor without combining the through-the-lens image with the multiple image developed data preprocessed in the above described step S8003 illustrated in FIG. 8. However, indications of various types of information and icons may be displayed by being superimposed on the image. Alternatively, the microcomputer 123 may display an image generated by combining the through-the-lens image and the already captured multiple image developed data at the combination ratio 100:0, which substantially produces the same result as the above-described processing. FIG. 11B illustrates a display example at this time.

If the digital camera 100 performs the live view display showing a combined image of the already captured multiple image developed data and the through-the-lens image before step S8012, the microcomputer 123 may gradually reduce the combination ratio of the multiple image developed data to smoothly change the display to a display showing only the through-the-lens image. Stopping a multiple image display and starting a display showing only the through-the-lens image in this way facilitate a user's determination whether the through-the-lens image is in focus during the manual focus operation, thereby facilitating the manual focus operation.

In step S8013, the microcomputer 123 determines whether a predetermined time has passed since completion of the MF operation. The predetermined time may be any time which is long enough to assume that the user's MF operation and check of the through-the-lens image along therewith have been completed. For example, the predetermined time can be several seconds. If the microcomputer 123 determines that the predetermined time has not passed yet (NO in step S8013), the microcomputer 123 waits until the predetermined time has passed from completion of the MF operation. If the microcomputer 123 determines that the predetermined time has passed (YES in step S8013), the processing proceeds to step S8014.

In step S8014, the microcomputer 123 returns the combination ratio in the live view to the combination ratio before step S8012. Accordingly, if the digital camera 100 is not in the enlargement mode, during the multiple image live view display processing in step S8005, the live view display is performed to show a multiple image combination result image generated by combining the multiple image developed data preprocessed in step S8003 and the through-the-lens image, as will be described below with reference to FIG. 9. After completion of the processing in step S8014, the processing returns to step S8005 to repeat the processing.

Figure 9:
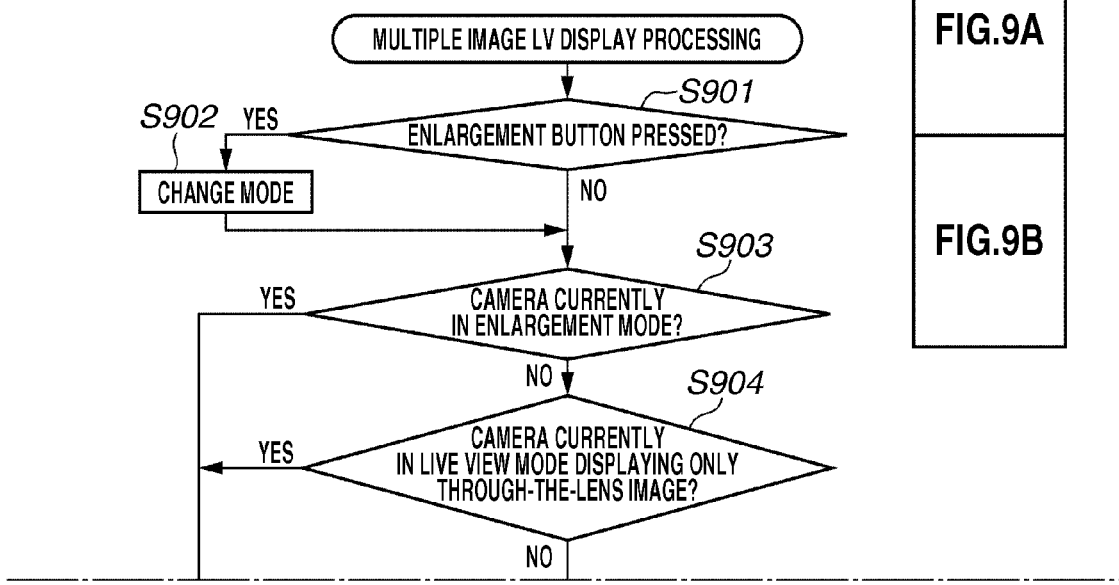
FIG. 9 (including FIGS. 9A and 9B) is a flowchart illustrating multiple image live view display processing.
Figure 9B:
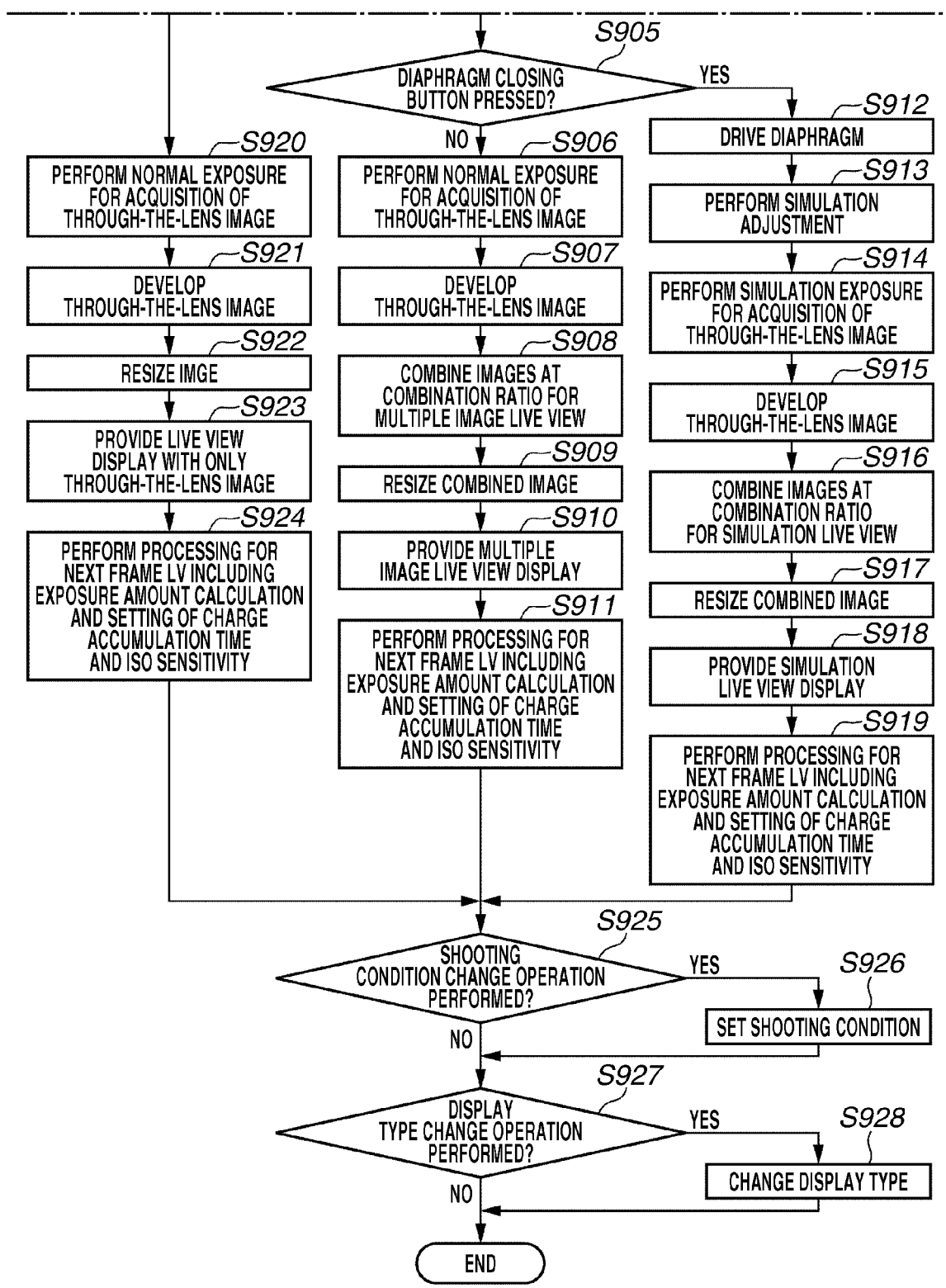

FIG. 9 (including FIGS. 9A and 9B) is a flowchart illustrating the above-described multiple image live view display processing performed in step S8005 illustrated in FIG. 8. The microcomputer 123 develops the program recorded in the non-volatile memory 130 onto the system memory 132 to execute it, by which the processing illustrated in FIG. 9 can be realized. FIG. 11A illustrates an example of the multiple image developed data. This image is an image generated from multiple image combination of images captured up to that time, and corresponds to the multiple image developed data acquired in step S8002. FIG. 11B illustrates the display example of only a through-the-lens image. In the multiple image live view display processing, the digital camera 100 displays, as the live view display, an image generated from multiple image combination of the multiple image developed data illustrated in FIG. 11A and the through-the-lens image illustrated in FIG. 11B at a different combination ratio according to whether this is a simulation live view.

In step S901, the microcomputer 123 determines whether the enlargement button 23 is pressed. If the microcomputer 123 determines that the enlargement button 23 is pressed (YES in step S901), the processing proceeds to step S902. If the enlargement button 23 is not pressed (NO in step S901), the processing proceeds to step S903.

In step S902, the microcomputer 123 changes the mode according to the pressing of the enlargement button 23. More specifically, when the enlargement button 23 is pressed in step S901, the microcomputer 123 refers to the enlargement mode flag stored in the system memory 132. Then, if the enlargement mode flag currently indicates the enlargement OFF mode (enlargement is not effective), the microcomputer 123 changes the mode to the enlargement mode (five times enlargement). If the enlargement mode flag currently indicates the enlargement mode (five times enlargement), the microcomputer 123 changes the mode to the enlargement mode (ten times enlargement). Further, if the enlargement mode flag currently indicates the enlargement mode (ten times enlargement), the microcomputer 123 changes the mode to the enlargement OFF mode.

If the microcomputer 123 changes the mode to the enlargement mode (five times enlargement), the microcomputer 123 stops the multiple image display in the live view display, and starts a display showing only a through-the-lens image while enlarging the full screen display thereof (a display of the through-the-lens image at a maximum size allowing the whole image to be contained in the entire display area) five times. If the microcomputer 123 changes the mode to the enlargement mode (ten times enlargement), the microcomputer 123 starts a display showing only the through-the-lens image while enlarging the full screen display thereof ten times. If the microcomputer 123 changes the mode to the enlargement OFF mode (enlargement is not effective), the microcomputer 123 restarts the multiple image display of the through-the-lens image and the already captured image (the multiple image developed data preprocessed in the above-described step S8003). The microcomputer 123 records the information about the enlargement mode as a result of the change into the system memory 132 as the enlargement mode flag.

In step S903, the microcomputer 123 refers to the enlargement mode flag stored in the system memory 132 to determine whether the enlargement mode flag currently indicates the enlargement mode. If the enlargement mode flag indicates the enlargement mode (five times enlargement) or the enlargement mode (ten times enlargement), the microcomputer 123 determines that the digital camera 100 is currently in the enlargement mode (YES in step S903), and then the processing proceeds to step S920. If the enlargement mode flag indicates enlargement OFF mode (enlargement is not effective), the microcomputer 123 determines that the digital camera 100 is not currently in the enlargement mode (NO in step S903), and then the processing proceeds to step S904.

In step S904, the microcomputer 123 determines whether the current display type is the live view display showing only a through-the-lens image. The display type during the live view can be switched between a display showing multiple images and the live view display showing only a through-the-lens image without showing multiple images, according to pressing of the information display button 16 (corresponding to the operation in step S927, which will be described below). If the microcomputer 123 determines that the current display type is the live view display showing only a through-the-lens image (YES in step S904), the processing proceeds to step S920. Whereas if not (NO in step S904), the processing proceeds to step 905.

In step S905, the microcomputer 123 determines whether the diaphragm closing button 15 is pressed. If the microcomputer 123 determines that the diaphragm closing button 15 is pressed (currently being pressed) (YES in step S905), the processing proceeds to step S912. If the microcomputer 123 determines that the diaphragm closing button 15 is not pressed (i.e., released) (NO in step S905), the processing proceeds to step S906.

In step S906, the microcomputer 123 controls the image sensor 112 and the diaphragm drive circuit 104 to perform a normal exposure for acquisition of a through-the-lens image to thereby acquire the through-the-lens image. During the normal exposure for acquisition of a through-the-lens image, the diaphragm 103 is opened (the diaphragm value is minimized) to reduce the depth of field to facilitate a check of the focus state in the live view display, regardless of a diaphragm value set for actual shooting with use of the SW2. Then, an exposure is performed while adjusting the charge accumulation time and sensitivity (ISO sensitivity) of the image sensor 112 to achieve brightness suitable for viewing.

In step S907, the microcomputer 123 applies the development processing to the through-the-lens image acquired from the exposure in step S906.

In step S908, the microcomputer 123 combines the through-the-lens image developed in step S907 and the multiple image developed data preprocessed in the above-described step S803 in FIG. 8 at a combination ratio for the multiple image live view. The combination ratio for the multiple image live view is the combination ratio indicated by the above-described equation (5). In other words, the combination ratio for the multiple image live view is such a combination ratio that the combination ratio of a through-the-lens image is set to M (M is 0.5 or more), and the combination ratio of multiple image developed data is set to (1−M). As a result, during the multiple image live view display showing the image generated from multiple image combination of the through-the-lens image and the already captured image, a user can more easily view the through-the-lens image that will be shot now compared to the already captured image (multiple image developed data).

FIG. 10A illustrates examples of the combination ratio for the multiple image live view. For example, as the combination ratio for the multiple image live view in the automatic exposure adjustment mode, the combination ratio of a through-the-lens image is fixed to 60% (M=0.6), and the combination ratio of multiple image developed data, which is an already captured image, is set to 40% (1−M=0.4). If two or more images have been already shot in one set of multiple exposure shooting (or if a base image is set to be used, and one or more image has been already shot), the multiple image developed data is in such a state that several images have been already evenly combined. Therefore, the combination ratio per image for the already captured images according to the combination ratio for the multiple image live view is calculated by evenly dividing 40%, which is the combination ratio of the multiple image developed data, by the number of the already captured images.

Due to the employment of this combination ratio, the multiple image live view display shows the already captured images lightly while showing the through-the-lens image relatively clearly. Therefore, a photograph can easily adjust the composition in consideration of how an image to be shot will be combined with the already captured images. In addition, the photographer can easily bring the digital camera 100 into focus and adjust the shutter timing for an image to be shot.

In step S909, the microcomputer 123 resizes a multiple image combination result image generated by combining the through-the-lens image and the already captured image (multiple image developed data) in step S908, according to an output destination (the display member 118 or the external monitor). For example, if the output destination is the display member 118 of the camera main body, the microcomputer 123 resizes the image into an image with a width of 720 pixels and a height of 480 pixels. If the output destination is the external monitor which is a high vision monitor, the microcomputer 123 resizes the image into an image with a width of 1620 pixels and a height of 1080 pixels. Further, the microcomputer 123 may resize the image after trimming the upper and lower portions thereof, into an image with a width of 1920 pixels and a height of 1080 pixels.

Figure 11C:
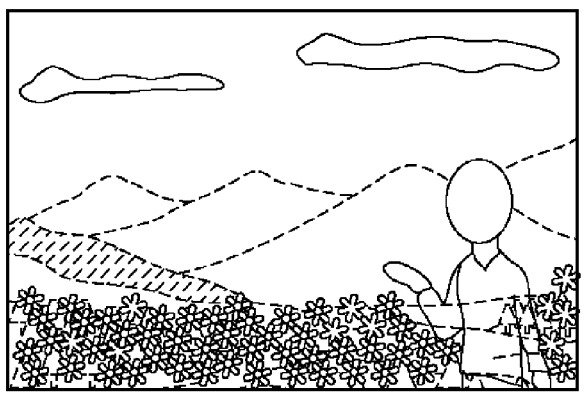

In step S910, the microcomputer 123 displays the multiple image combination result image resized in step S909 on the display member 118 or the external monitor (the multiple image live view display). FIG. 11C illustrates a display example of the multiple image live view display. In the example illustrated in FIG. 11C, the already captured image is displayed lightly, while the through-the-lens image is displayed relatively clearly as a result of the combination processing in the above-described step S908, so that a user can easily check the through-the-lens image especially. In step S911, the microcomputer 123 calculates an exposure amount to be used in acquisition of a through-the-lens image (image capturing) for the next frame based on the through-the-lens image acquired in step S906, sets the diaphragm value to an open value, and sets the charge accumulation time and the sensitivity of the image sensor 112.

On the other hand, if the microcomputer 123 determines in step S905 that the diaphragm closing button 15 is currently being pressed (YES in step S905), the processing proceeds to step S912 to start a simulation display of a multiple image combination result image that will be actually generated from actual shooting.

In step S912, the microcomputer 123 drives the diaphragm 103 according to the diaphragm value (the diaphragm value set by the user or the diaphragm value automatically calculated based on a program diagram) as a shooting condition set for actual shooting with use of the SW2. The microcomputer 123 can set the same depth of field for the through-the-lens image as the depth of field of an image to be shot in actual shooting by driving the diaphragm 103 to the diaphragm value set for actual shooting, and allow a user to check whether the image blurs.

In step S913, the microcomputer 123 fixes the diaphragm value set for actual shooting and adjusts the charge accumulation time and the sensitivity to achieve brightness closer to the brightness of the image that will be acquired from actual shooting under the current shooting conditions set for actual shooting (simulation adjustment). First, the microcomputer 123 sets the charge accumulation time within the range of charge accumulation time for acquisition of a through-the-lens image to approach the shutter speed set as one of the shooting conditions. Then, the microcomputer 123 adjusts the sensitivity and supplement a shortfall from the adjustment of the charge accumulation time to achieve the set shutter speed.

For example, in a case where a through-the-lens image is updated every 1/30 second, the charge accumulation time for acquisition of a through-the-lens image cannot be set to be longer than 1/30 second. Therefore, in a case where the shutter speed is set to be longer than 1/30 second as the shooting condition, the microcomputer 123 sets the charge accumulation time to the settable longest time for acquisition of a through-the-lens image, and amplifies the sensitivity by an amount corresponding to the shortfall to achieve the shutter speed.

In step S914, the microcomputer 123 acquires a through-the-lens image by performing an exposure according to the diaphragm value, the charge accumulation time, and the sensitivity set in steps S912 and S913 (simulation exposure).

In step S915, the microcomputer 123 applies the development processing to the through-the-lens image acquired by the exposure in step S914.

In step S916, the microcomputer 123 combines the through-the-lens image developed in step S915 and the multiple image developed data preprocessed in the above-described step S8003 in FIG. 8 at a combination ratio for the simulation live view. The combination ratio for the simulation live view is the combination ratio indicated by the above-described equations (6) or (7). A user can check what kind of image will be generated as a multiple image combination result image from actual shooting under the current shooting conditions before execution of the actual shooting operation by viewing the simulation live view display.

FIG. 10B illustrates examples of the combination ratio for the simulation live view. The combination ratio for the simulation live view in the automatic exposure adjustment mode is determined so that a through-the-lens image and an already captured image are combined at the same combination ratio. In other words, the combination ratio of a through-the-lens image varies according to the number of already captured images.

For example, in a case where the digital camera 100 is not set to use a base image, and has shot three images up to that time in one set of multiple exposure shooting, the combination ratio of the through-the-lens image is 1/4 (25%), and the combination ratio of the multiple image developed data is 3/4 (75% in total; 25% for each image). Due to this display, a photographer can check what kind of image will be generated as a multiple image combination result image in terms of combination balance, brightness, density, and a depth of field from actual shooting under the current shooting conditions, and thereby can appropriately adjust the shooting conditions.

In step S917, the microcomputer 123 resizes the multiple image combination result image generated by combining the through-the-lens image and the already captured image (multiple image developed data) in step S916 according to an output destination (the display member 118 or the external monitor).

Figure 11D:
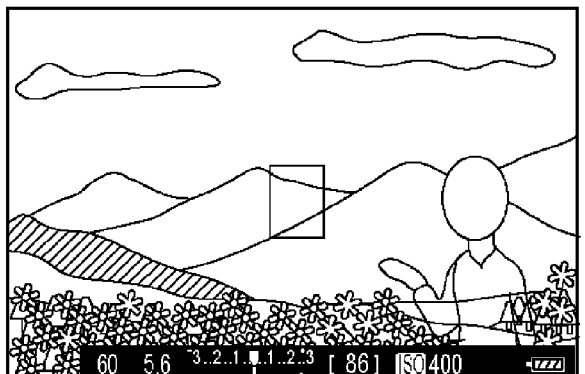

In step S918, the microcomputer 123 displays the multiple image combination result image resized in step S917 on the display member 118 or the external monitor (the simulation live view display). FIG. 11D illustrates a display example of the simulation live view display. The image displayed in FIG. 11D is an image reflecting the shooting conditions and the setting state of the automatic exposure adjustment function, and therefore does not necessarily provide clear visibility of the through-the-lens image. However, this image enables a user to know how a multiple image combination result image generated from actual shooting will look like.

Further, since the image illustrated in FIG. 11D is an image reflecting the shooting conditions, a dialog 1101 is displayed to notify a user of the currently set shooting conditions. The dialog 1101 illustrated in FIG. 11D indicates a shutter speed (time value (Tv)), a diaphragm value (aperture value (Av)), an exposure correction, a number of remaining images that can be shot, ISO sensitivity, and a remaining battery capacity from the left side in this order. A user can change the shooting conditions while confirming what kind of effect the change in the shooting conditions provides by viewing the dialog 1101 and the simulation live view display.

In step S919, the microcomputer 123 calculates an exposure amount to be used in acquisition (image capturing) of a through-the-lens image for the next frame based on the through-the-lens image acquired in step S914, sets the diaphragm value to the value set as the shooting condition, and sets the charge accumulation time and the sensitivity of the image sensor 112.

The processes insteps S920, S921, and S922 performed in the enlargement mode or the live view mode displaying only a through-the-lens image are similar to the processes in steps S906, S907, and S909, respectively, and therefore the descriptions thereof will be omitted here.

In step S923, the microcomputer 123 displays only the through-the-lens image resized in step S922 on the display member 118 or the external monitor without performing multiple image combination. However, indications of various types of information and icons may be displayed by being superimposed on the image.

FIG. 11B illustrates the display example at this time. The process in step S924 is similar to the process in step S911, and therefore the description thereof will be omitted here.

In this way, in the enlargement mode or the live view mode displaying only a through-the-lens image, only a through-the-lens image is displayed in the live view without being combined with another image. Instead, the processes in steps S906 to S911 may be performed at the combination ratio of the through-the-lens image and the already captured multiple image developed data set to 100:0, which substantially produces the same result as the above-described processes.

In step S925, the microcomputer 123 determines whether the user performs an operation for changing the shooting conditions. If the user performs an operation for changing the shooting conditions (YES in step S925), then in step S926, the microcomputer 123 changes the shooting conditions according to the operation (setting of shooting conditions). The shooting conditions changeable according to a user's operation include at least a shutter speed (Tv value), a diaphragm value (Av value), an exposure correction, ISO sensitivity, white balance, and others. Among them, the shooting conditions changeable according to a user's operation vary according to the shooting mode set by the shooting mode dial 14 as described above.

In step S927, the microcomputer 123 determines whether the user performs an operation for changing the display type by pressing the information display button 16. If the microcomputer 123 determines that the information display button 16 is pressed (YES in step S927), then in step S928, the microcomputer 123 changes the display type. If the current display type is the live view mode displaying multiple images, the microcomputer 123 changes the display mode to the live view mode displaying only a through-the-lens image. Further if the current display type is the live view mode displaying only a through-the-lens image, the microcomputer 123 changes the display mode to the live view mode displaying multiple images.

FIG. 11B illustrates the display example of the live view mode displaying only a through-the-lens image. The image illustrated in FIG. 11B shows only a through-the-lens image, and a user can easily perform an operation for affecting only the through-the-lens image such as a check of a focus state or an adjustment of shutter timing by viewing the image. The digital camera 100 may switch the display mode from the live view mode displaying multiple images to the live view mode displaying only a through-the-lens image while gradually changing the combination ratio to smoothly change the display, instead of changing the display instantly. If the microcomputer 123 determines in step S927 that the user does not perform an operation for changing the display type (NO in step S927), or after the microcomputer 123 completes the process in step S928, the multiple image live view display processing is ended. Then, the processing proceeds to step S8006 illustrated in FIG. 8.

Figure 12:
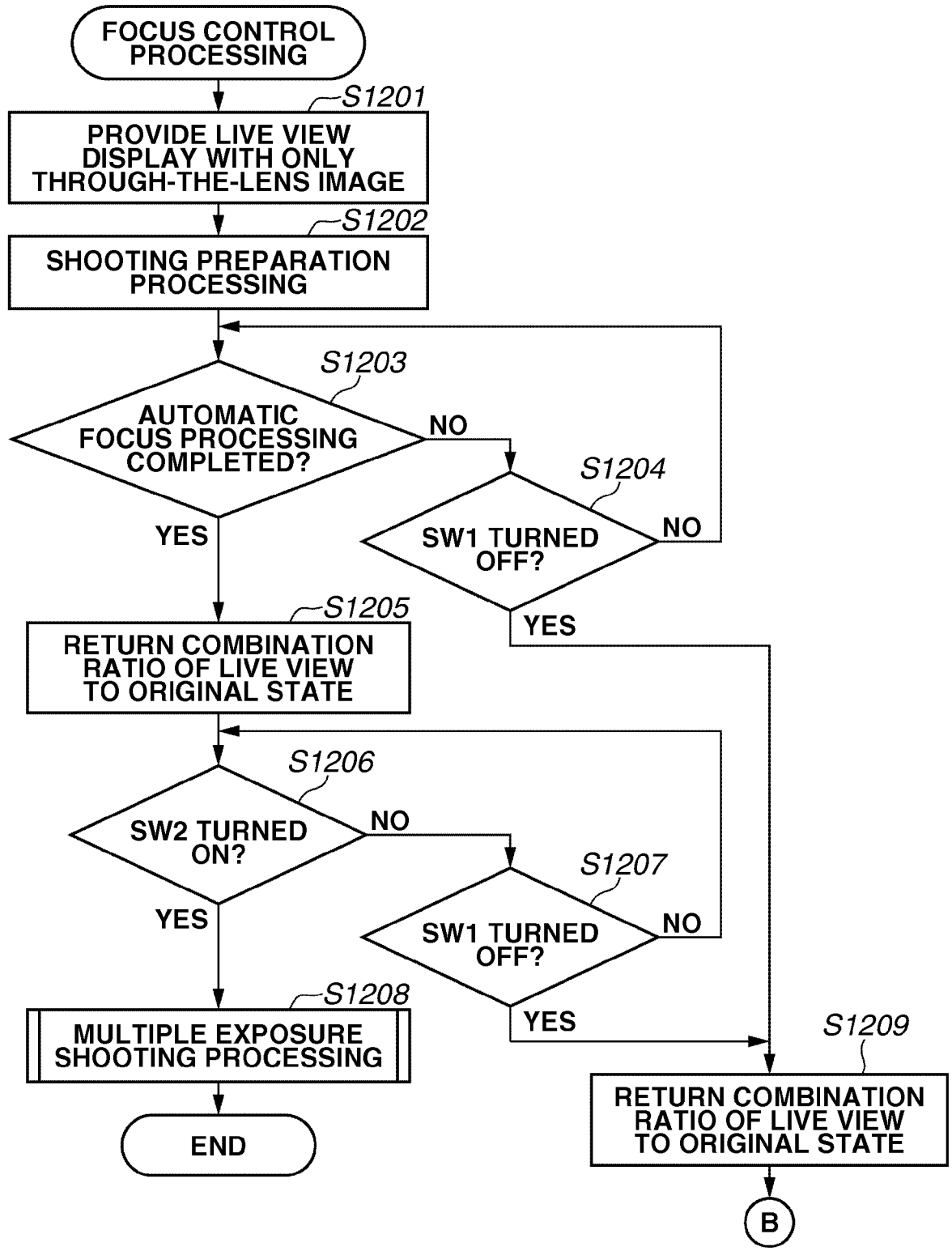
FIG. 12 is a flowchart illustrating focus control processing.

FIG. 12 is a flowchart illustrating the above-described focus control processing performed in step S8007 in FIG. 8. The microcomputer 123 develops the program recorded in the non-volatile memory 130 onto the system memory 132 to execute it, by which the processing illustrated in FIG. 12 can be realized.

In step S1201, the microcomputer 123 performs the live view display showing only a through-the-lens image on the display member 118 or the external monitor without combining the image with the multiple image developed data preprocessed in the above-described step S8003 in FIG. 8. However, indications of various types of information and icons may be displayed by being superimposed the image. Alternatively, the microcomputer 123 may display an image generated by combining the through-the-lens image and the already captured multiple image developed data at the combination ratio 100:0, which substantially produces the same result as the above-described processing. FIG. 11B illustrates the display example at this time. In a case where the display mode before step S1201 is the live view mode displaying a combined image of the already captured multiple image developed data and the through-the-lens image, the microcomputer 123 may gradually reduce the combination ratio of the multiple image developed data to smoothly change the display to a display only showing the through-the-lens image.

In step S1202, the microcomputer 123 starts shooting preparation processing. The shooting preparation processing includes at least the automatic focus processing (focus adjustment processing) and the light metering processing (or automatic exposure (AE) processing).

In step S1203, the microcomputer 123 determines whether the automatic focus (AF) processing is completed. If the microcomputer 123 determines that the AF processing is not yet completed (NO in step S1203), the processing proceeds to step S1204. If the microcomputer 123 determines that the AF processing is completed (YES in step S1203), the processing proceeds to step S1205.

In step S1204, the microcomputer 123 determines whether the SW1 is turned OFF, i.e., whether half-pressing of the release button 10 is released. If the SW1 is not turned OFF (NO in step S1204), the processing returns to step S1203, in which the microcomputer 123 continues the shooting preparation processing. If the SW1 is turned OFF (YES in step S1204), the processing proceeds to step S1209.

In step S1205, the microcomputer 123 returns the combination ratio of the live view to the state before the execution of the process in step S1201. As a result, in a case where the digital camera 100 is not in the enlargement mode, the live view display is performed, showing the multiple image combination result image generated by combining the multiple image developed data preprocessed in step S8003 and the through-the-lens image in the multiple image live view display processing in step S8005. In other words, if the digital camera 100 is not in the enlargement mode, the microcomputer 123 causes the multiple image live view display or the simulation live view display described above with reference to FIG. 9.

In step S1206, the microcomputer 123 determines whether the SW2 is turned ON. If the SW2 is not turned ON (NO in step S1206), the processing proceeds to step S1207. If the SW2 is turned ON (YES in step S1206), the processing proceeds to step S1208.

In step S1207, the microcomputer 123 determines whether the SW1 is turned OFF, i.e., whether half pressing of the release button 10 is released. If the SW1 is not turned OFF (NO in step S1207), the processing returns to step S1206. If the SW1 is turned OFF (YES in step S1207), the processing proceeds to step S1209.

In step S1208, the microcomputer 123 performs the multiple exposure shooting processing. The multiple exposure shooting processing is already described with reference to FIG. 6, and therefore the description thereof will be omitted here. After completion of the process in step S1208, the focus control processing is ended, and the processing proceeds to step S8008 illustrated in FIG. 8.

On the other hand, in step S1209, since the SW1 is turned OFF before execution of actual shooting, the microcomputer 123 returns the combination ratio of the live view to the state before the execution of the process in step S1201. Then, the processing proceeds to step S8507 illustrated in FIG. 8.

According to the processing illustrated in FIG. 12, when a user presses the SW1 to start the AF processing, the microcomputer 123 stops the live view display showing multiple images, and starts the display showing only the through-the-lens image. Upon completion of the AF processing, the microcomputer 123 returns the display to the live view display showing multiple images. Accordingly, during the AF processing, the user can easily check the focus state through the AF processing by viewing the through-the-lens image. Further, after the AF processing is completed and the image is set in focus, the microcomputer 123 restarts the live view display showing multiple images, so the user can make a final adjustment of the composition in preparation for actual shooting with use of the SW2.

The microcomputer 123 may control the live view display to show only the through-the-lens image for a predetermined time from completion of the AF processing, and return the display to the live view display showing multiple images after the predetermined time has passed from the completion of the AF processing, so that the user can more closely check the result of the AF processing. In this case, the processing illustrated in FIG. 12 may add a step for determining whether the predetermined time (several seconds) has passed after the microcomputer 123 determines that the AF processing is completed in step S1203, to immediately before step S1205, and the processing may proceed to step S1205 if it is determined that the predetermined time has passed.

As described above, according to the present exemplary embodiment of the present invention, the microcomputer 123 sets the combination ratio of the through-the-lens image to be higher than the combination ratio of the already captured image to be combined, during the live view display showing the through-the-lens image and the already captured image while combining them. Accordingly, the through-the-lens image can be clearly displayed, and the visibility of the through-the-lens image can be enhanced. Moreover, the visibility of the through-the-lens image can be further enhanced by setting the combination ratio of the through-the-lens image to a fixed value regardless of the number of already captured images to be combined.

On the other hand, according to the present exemplary embodiment of the present invention, it is possible to change the combination ratio of the through-the-lens image and the already captured image to be combined according to a user's instruction, to allow a user to preliminary tentatively check what kind of image will be generated as a multiple image combination result image to be generated from actual shooting and recorded to the recording medium 120. In this way, it is possible to perform the live view display with the through-the-lens image combined at a more suitable combination ratio according to a user's intention during multiple exposure shooting.

Further, it is possible to facilitate a user to check an adjusted focus state by stopping the multiple image live view display and starting the display showing only the through-the-lens image during the focus adjustment by the AF or MF processing. Then, since the microcomputer 123 returns the display to the multiple image live view display after completion of the focus adjustment, the user can shoot an image after confirming and adjusting the composition as to how an image to be shot now will be combined with the already captured image immediately before a shooting instruction (SW2).

The above exemplary embodiment is described based on an example in which multiple image combination is performed with use of developed data. However, multiple image combination may be performed with use of raw image data before the development.

Further, according to the above-described exemplary embodiment, the combination ratio is switched between the combination ratio for the multiple image live view (a first combination ratio) and the combination ratio for the simulation live view (a second combination ratio) according to whether the diaphragm closing button 15 is pressed. However, the combination ratio may be switched among a wider variation of combination ratios according to a user's purpose.

For example, one possible method is to further increase the combination ratio of the through-the-lens image, for example, in a shooting mode such as the night scene shooting mode that may show the through-the-lens image extremely darkly, or when it is detected that the acquired through-the-lens image is dark. Further, in the above-described exemplary embodiment, the simulation live view display is performed as long as the diaphragm closing button 15 is pressed. However, the present invention is not limited to this configuration as long as the display can be switched between the simulation live view display and the multiple image live view display according to a user's operation.

Further, the control of the microcomputer 123 may be realized by a single hardware device, or a plurality of hardware devices may work together to control the entire apparatus while appropriately dividing the processing among them.

Further, the above exemplary embodiment has been described based on an example in which the present invention is applied to a digital camera, but the present invention is not limited to this example. The present invention can be applied to any imaging apparatus including an imaging unit. In other words, the present invention can be applied to a digital camera, a digital video camera, a personal computer or personal digital assistant (PDA) equipped with a camera, a mobile phone unit equipped with a camera, a music player equipped with a camera, a game machine equipped with a camera, an electronic book reader equipped with a camera, and other apparatuses.

Aspects of the present invention can also be realized by a computer of a system or apparatus (or devices such as a central processing unit (CPU) or a micro processing unit (MPU)) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments, and can include various other embodiments without departing from the spirit or scope of the present invention. Further, the embodiment provided herein indicates only an example of an embodiment, and the features of the embodiment may be arbitrarily combined with other embodiments. The scope of the following claims is to be accorded the broadest interpretation so as to encompass all modifications, equivalent structures, and functions.

This application claims priority from Japanese Patent Application No. 2011-101312 filed Apr. 28, 2011, which is hereby incorporated by reference herein in its entirety.

What is claimed is:

1. An imaging apparatus comprising
an imaging unit;
a generation unit configured to generate a multiple image combination result image by combining a through-the-lens image captured by the imaging unit and at least one already captured image;
a focus adjustment unit configured to perform a focus adjustment by driving a focus lens; and
a display control unit configured to perform control to display the multiple image combination result image generated by the generation unit on a display unit while sequentially updating the multiple image combination result image,
wherein the display control unit performs control to stop displaying the multiple image combination result image in a case where the focus adjustment unit starts a focus adjustment, and display the through-the-lens image captured by the imaging unit on the display unit while sequentially updating the through-the-lens image, and performs control to display the multiple image combination result image after the focus adjustment is completed.

2. The imaging apparatus according to claim 1, wherein the focus adjustment unit performs automatic focus processing.

3. The imaging apparatus according to claim 1, wherein the focus adjustment unit performs a manual focus adjustment according to a user's operation.

4. The imaging apparatus according to claim 1, wherein the display control unit performs control to display the multiple image combination result image generated by the generation unit on the display unit while sequentially updating the multiple image combination result image after a predetermined time has passed from completion of the focus adjustment by the focus adjustment unit.

5. The imaging apparatus according to claim 1, further comprising a shooting processing unit configured to shoot an image in a focus state adjusted by the focus adjustment unit to record the shot image in a recording medium according to a reception of a shooting instruction, when the display control unit displays the multiple image combination result image generated by the generation unit on the display unit while sequentially updating the multiple image combination result image after the focus adjustment unit completes the focus adjustment.

6. A method for controlling an imaging apparatus including an imaging unit, the method comprising:
generating a multiple image combination result image by combining a through-the-lens image captured by the imaging unit and at least one already captured image, as a generation operation;
adjusting a focus state by driving a focus lens, as a focus adjustment operation;
performing control to display the multiple image combination result image generated by the generation operation on a display unit while sequentially updating the multiple image combination result image,
wherein performing control to stop displaying the multiple image combination result image in a case where the focus adjustment operation starts a focus adjustment, and display the through-the-lens image captured by the imaging unit on the display unit while sequentially updating the throuqh-the-lens image, and performs control to display the multiple image combination result image after the focus adjustment is completed.

7. A non-transitory computer readable storage medium storing a program capable of causing a computer to function as the respective units of the imaging apparatus according to claim 1.

8. The imaging apparatus according to claim 1, further comprising an instruction unit configured to receive an enlargement display instruction,
wherein the display control unit performs control to stop displaying the multiple image combination result image in response to reception of the enlargement display instruction during display of the multiple image combination result image, and enlarge and display the through-the-lens image captured by the imaging unit on the display unit.

9. The imaging apparatus according to claim 1, further comprising a shooting processing unit configured to, in a case where a shooting instruction is received after the focus adjustment unit completes a focus adjustment and when the display control unit displays the multiple image combination result image generated by the generation unit on the display unit while sequentially updating the multiple image combination result image, capture an image in a focus adjusted by the focus adjustment unit, and record a multiple image combination result image which is obtained by combining the captured image and the at least one already captured image in a recording medium.

10. An imaging apparatus comprising:
an imaging unit;
a generation unit configured to generate a multiple image combination result image by combining a through-the-lens image captured by the imaging unit and at least one already captured image;
a focus adjustment unit configured to perform a focus adjustment; and
a display control unit configured to perform switching between a first display in which a through-the-lens image captured by the imaging unit is displayed on a display unit while being sequentially updated and a second display in which a multiple image combination result image generated by the generation unit is displayed on the display unit while being sequentially updated,
wherein the display control unit switches the second display to the first display in response to that the focus adjustment unit starts a focus adjustment, and switches the first display to the second display after the focus adjustment is completed.

* * * * *